United States Patent
Brucker et al.

(10) Patent No.: US 10,921,819 B2
(45) Date of Patent: Feb. 16, 2021

(54) AUTOMATED GUIDED VEHICLE SYSTEM AND AUTOMATED GUIDED VEHICLE FOR USE THEREIN

(71) Applicant: ASI Technologies, Inc., Montgomeryville, PA (US)

(72) Inventors: Christopher Brucker, Telford, PA (US); Jeffrey Grabner, Gilbertsville, PA (US); John William Cross, Collegeville, PA (US); Joseph Robinson, Sellersville, PA (US)

(73) Assignee: ASI Technologies, Inc., Montgomeryville, PA (US)

( * ) Notice: Subject to any disclaimer, the term of this patent is extended or adjusted under 35 U.S.C. 154(b) by 64 days.

(21) Appl. No.: 16/114,659

(22) Filed: Aug. 28, 2018

(65) Prior Publication Data
US 2020/0073402 A1 Mar. 5, 2020

(51) Int. Cl.
*B62D 1/24* (2006.01)
*G05D 1/02* (2020.01)

(52) U.S. Cl.
CPC ......... *G05D 1/0263* (2013.01); *G05D 1/0238* (2013.01); *G05D 1/0244* (2013.01); *G05D 1/0278* (2013.01); *G05D 2201/0216* (2013.01)

(58) Field of Classification Search
CPC .. G05D 1/0263; G05D 1/0238; G05D 1/0278; G05D 1/02; G05D 1/00; G05D 1/0259; G05D 1/021; G05D 1/0261; G05D 2201/0216
See application file for complete search history.

(56) References Cited

U.S. PATENT DOCUMENTS

| | | | |
|---|---|---|---|
| 3,172,496 A | | 3/1965 | Rabinow et al. |
| 4,137,984 A | * | 2/1979 | Jennings ........... B62D 1/28 180/168 |
| 4,780,817 A | * | 10/1988 | Lofgren ............ G05D 1/0265 180/168 |
| 4,811,229 A | | 3/1989 | Wilson |
| 5,199,524 A | | 4/1993 | Ivancic |
| 5,658,120 A | * | 8/1997 | Watanabe ........... B23Q 7/1436 414/495 |
| 5,764,014 A | | 6/1998 | Jakeway et al. |
| 5,988,306 A | | 11/1999 | Ooishi |
| 6,345,217 B1 | * | 2/2002 | Zeitler ............... G05D 1/0261 318/587 |

(Continued)

FOREIGN PATENT DOCUMENTS

| | | |
|---|---|---|
| WO | 20050077240 A2 | 8/2005 |
| WO | 2016126626 A1 | 8/2016 |
| WO | 2017004524 A1 | 1/2017 |

*Primary Examiner* — James M Dolak
(74) *Attorney, Agent, or Firm* — Caesar Rivise, PC

(57) ABSTRACT

Disclosed is an automated guided vehicle system including at least one AGV for following predetermined magnetic paths on a ground surface to carry cargo to selected points on the paths. The AGV includes a chassis, top plate mounted on the chassis for receipt of cargo, a pair of driving wheels coupled to driving motors, and plural passive omni-wheels. Control and navigation circuitry is provided to operate the motors to drive the driving wheels to cause the AGV to follow a desired one of the paths. The AGV provides illumination indicating its direction of travel and status. It also includes laser scanners for obstacle detection.

28 Claims, 9 Drawing Sheets

(56) References Cited

U.S. PATENT DOCUMENTS

| | | | |
|---|---|---|---|
| 7,213,663 B2 | 5/2007 | Kim | |
| 7,456,596 B2 | 11/2008 | Goodall et al. | |
| 7,866,671 B2 | 1/2011 | Madler | |
| 7,914,020 B2 | 3/2011 | Boston | |
| 8,210,791 B2 * | 7/2012 | Chilson | B66F 9/063 180/167 |
| 8,417,383 B2 | 4/2013 | Ozick et al. | |
| 8,556,279 B2 * | 10/2013 | McKinnon | B62B 1/10 280/47.27 |
| 8,696,010 B2 | 4/2014 | Toebes et al. | |
| 8,706,394 B2 | 4/2014 | Trepagnier et al. | |
| 8,726,454 B2 | 5/2014 | Gilbert, Jr. et al. | |
| 8,954,188 B2 | 2/2015 | Sullivan et al. | |
| 8,965,619 B2 | 2/2015 | Sullivan et al. | |
| 9,096,375 B2 * | 8/2015 | Lert | B65G 1/1378 |
| 9,101,817 B2 * | 8/2015 | Doerksen | A63C 17/12 |
| 9,156,394 B2 | 10/2015 | Toebes et al. | |
| 9,187,244 B2 | 11/2015 | Toebes et al. | |
| 9,242,800 B2 | 1/2016 | Sullivan et al. | |
| 9,278,690 B2 * | 3/2016 | Smith | G01S 15/88 |
| 9,309,050 B2 | 4/2016 | Toebes et al. | |
| 9,317,038 B2 | 4/2016 | Ozick et al. | |
| 9,320,398 B2 | 4/2016 | Hussey et al. | |
| 9,321,591 B2 | 4/2016 | Lert et al. | |
| 9,327,407 B2 | 5/2016 | Jones et al. | |
| 9,327,903 B2 | 5/2016 | Toebes et al. | |
| 9,359,005 B2 | 6/2016 | Doan et al. | |
| 9,423,796 B2 | 8/2016 | Sullivan et al. | |
| 9,454,508 B2 | 9/2016 | Yu et al. | |
| 9,499,338 B2 | 11/2016 | Toebes et al. | |
| 9,517,885 B2 | 12/2016 | Sullivan et al. | |
| 9,519,882 B2 | 12/2016 | Galluzzo et al. | |
| 9,550,225 B2 | 1/2017 | Sullivan et al. | |
| 9,561,905 B2 | 2/2017 | Toebes et al. | |
| 10,434,924 B2 * | 10/2019 | Alfaro | B60K 7/0007 |
| 10,466,699 B2 * | 11/2019 | Hirata | B60K 11/00 |
| 10,589,929 B2 * | 3/2020 | Iellimo | B65G 1/0492 |
| 10,589,940 B2 * | 3/2020 | Yang | B65G 43/10 |
| 10,625,593 B2 * | 4/2020 | Gillett | B60W 50/082 |
| 10,635,113 B2 * | 4/2020 | Pfaff | G05D 1/0225 |
| 10,780,929 B2 * | 9/2020 | Moulin | B62D 21/18 |
| 2004/0074685 A1 | 4/2004 | Tham | |
| 2007/0151780 A1 | 7/2007 | Tonoli et al. | |
| 2010/0266381 A1 | 10/2010 | Chilson et al. | |
| 2010/0316468 A1 | 12/2010 | Lert et al. | |
| 2013/0340201 A1 | 12/2013 | Jang et al. | |
| 2015/0166060 A1 | 6/2015 | Smith | |
| 2016/0137416 A1 | 5/2016 | Toebes et al. | |
| 2016/0231746 A1 | 8/2016 | Hazelton et al. | |
| 2016/0231751 A1 | 8/2016 | Mecklinger et al. | |
| 2016/0236866 A1 | 8/2016 | Sullivan et al. | |
| 2016/0244261 A1 | 8/2016 | Sullivan et al. | |
| 2016/0278599 A1 | 9/2016 | Seo et al. | |
| 2017/0001311 A1 | 1/2017 | Bushman et al. | |
| 2017/0088354 A1 | 3/2017 | Sullivan et al. | |
| 2017/0111453 A1 | 4/2017 | Hassan | |
| 2017/0113874 A1 | 4/2017 | Sullivan et al. | |
| 2017/0131720 A1 | 5/2017 | Sullivan et al. | |
| 2017/0182924 A1 * | 6/2017 | Lendo | G08G 1/166 |
| 2018/0072212 A1 | 3/2018 | Alfaro et al. | |

* cited by examiner

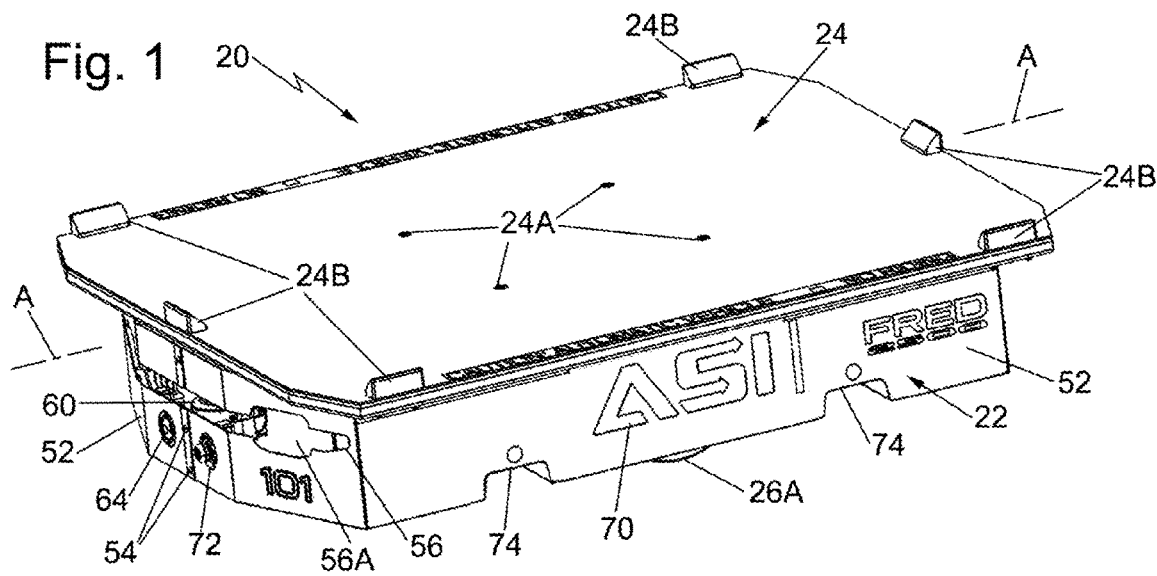
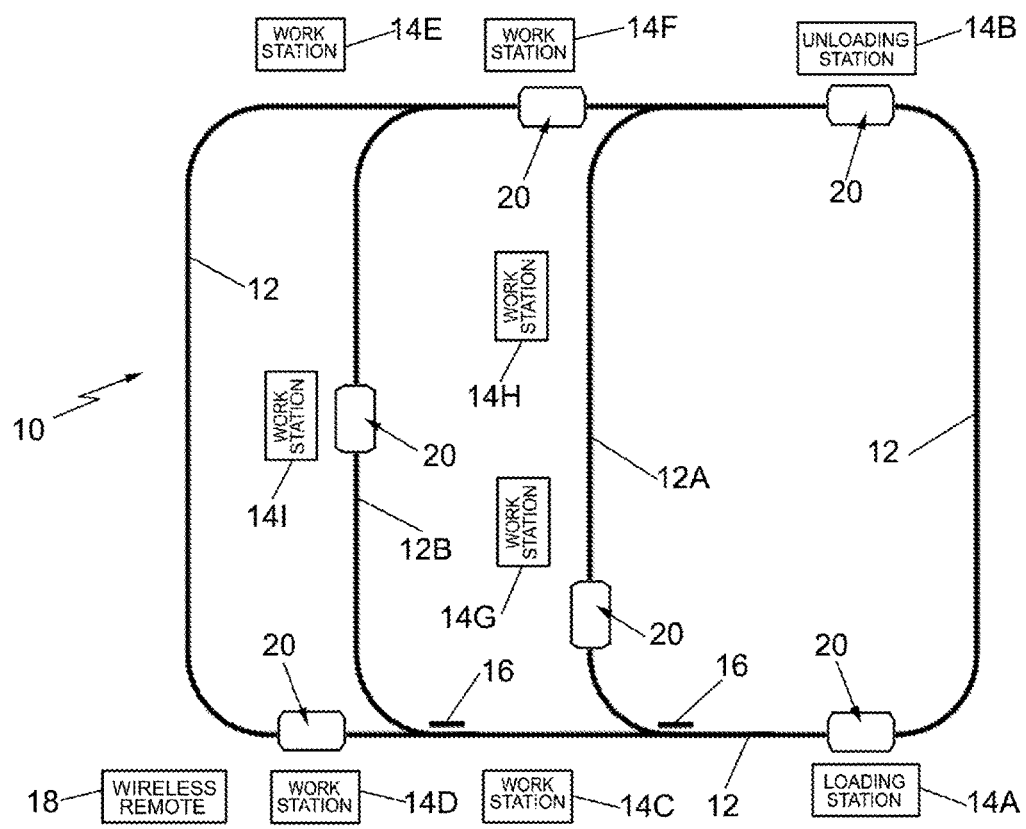

AUTOMATED GUIDED VEHICLE SYSTEM AND AUTOMATED GUIDED VEHICLE FOR USE THEREIN

CROSS-REFERENCE TO RELATED APPLICATION

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to automated guided vehicle systems and more particularly to automated guide vehicles configured for traversing predetermined magnetic paths on a ground surface, e.g., the floor of an industrial plant or warehouse, to enable the vehicle to reach and stop at various points along the path, to traverse branch paths if such branch paths exist, and to reverse direction if desired, all under the control of a guidance and navigation system.

BACKGROUND OF THE INVENTION

Automated guided vehicles ("AGVs") have gained increasing popularity for the movement of materials or cargo (e.g., parts), between work stations in a manufacturing plant or between stations in a warehouse or other material handling center. For example, in a factory application, the AGV (or each of the AGVs, if there are more than one), is configured to automatically carry the particular cargo, e.g., a portion of a component of a product or an assembly, from a pickup point or station on a prescribed path in the factory to carry that component to another point or station on the path where that component may be processed, e.g., assembled to another component, whereupon the processed components are then carried by the AGV to another point or station on the path, and so forth and so on until the completed component is carried to a discharge point where it can be removed from the AGV.

The navigation of the AGV along the paths can be accomplished in various ways. One typical way is through the use magnetic guidance. One particular, magnetic guidance technique is in the form of a magnetic strip which is disposed and secured on the ground surface or floor of the plant and extends to the various points or stations in the plant where the cargo is to be handled. The AGV includes a magnetic sensor to sense the magnetic strip and associated control and navigation circuitry coupled to the sensor and to motors to drive the AGV's wheels so that it follows a desired path and makes stops where appropriate. That magnetic path may be in the form of a continuous main loop whose starting and ending points coincide, or a may be a linear or non-linear path having a discrete starting point and a discrete ending point. In the latter case the AGV should be bidirectional to enable it to be brought back to the starting point. Moreover, the main path may have one or more branch paths extending from it so that the vehicle may turn off of the main path onto a desired branch path. The shape and size of the magnetic paths is strictly a matter of design based on the layout of the plant and the equipment at the various stations along the paths that the AGV may be called upon to stop.

While the AGVs and the magnetic guidance systems including the same that are commercially available today are generally suitable for their intended purposes, they nevertheless suffer from one or more of the following drawbacks: complexity of construction and concomitant cost, potential safety issues, ease of use and operation and flexibility to be tailored to a particular end use.

Thus, a need presently exists for an AGV system which addresses those drawbacks. The subject invention addresses that need.

SUMMARY OF THE INVENTION

One aspect of this invention is an automated guided vehicle configured to navigate and bi-directionally traverse magnetic path on a ground surface to carry cargo to selected points on the paths. The paths comprise a strip of magnetic material of a first polarity facing upward from the ground surface. The automated guided vehicle basically comprises a chassis, a top plate, control and navigation circuitry and a source of illumination. The chassis has a central longitudinal axis, a first section, a second section, and an intermediate section between the first and second sections. The first section includes at least one first passive omni-wheel configured for rotation about a fixed axis extending perpendicular to the central longitudinal axis but able to roll omni-directionally over the ground surface. The second section includes at least one second passive omni-wheel configured for rotation about a fixed axis extending perpendicular to the central longitudinal axis but able to roll omni-directionally over the ground surface. A first drive wheel is provided located at the intermediate section and is rotatable about a first transverse axis extending perpendicularly to the central longitudinal axis. A first motor is coupled to the first drive wheel and configured to rotate the first drive wheel about the first transverse axis to cause the first drive wheel to roll along the ground surface. A second drive wheel is provided located at the intermediate section and rotatable about a second transverse axis extending perpendicularly to the central longitudinal axis. A second motor is coupled to the second drive wheel and configured to rotate the second drive wheel about the second transverse axis to cause the second drive wheel to roll along the ground surface. The top plate is mounted on the chassis and is configured to support a cargo item or piece of equipment thereon. The control and navigation circuitry includes a magnetic sensor for sensing the strip of magnetic material and for operating the first and second motors to cause the vehicle to roll over the ground surface and along a desired one of the paths. The desired one of the paths is established by the control and navigation circuitry, whereupon the automated guided vehicle is selectively moved to selected ones of the points under the control of the control and navigation circuitry. The source of illumination provides illumination adjacent the first section when the automated guided vehicle is moving in one direction along the paths and provides illumination adjacent the second section when the automated guided vehicle is moving in an opposite direction along the paths, whereupon the source of illumination indicates the direction of travel of the automated guided vehicle along the paths.

In accordance with one preferred aspect of this invention the first section is modular and the second section is modular.

In accordance with another preferred aspect of this invention the first section comprises two first passive omni-wheels, each of the two first passive omni-wheels being located on respective transverse sides of the central longitudinal axis, and wherein the second section comprises two second passive omni-wheels, each of the two second passive omni-wheels being located on respective sides of the central longitudinal axis.

In accordance with another preferred aspect of this invention the chassis has a bottom surface and wherein the first and second sections include plural respective mounting points located at various distances from the bottom surface for selectively mounting the first and second passive omni-wheels thereat.

In accordance with another preferred aspect of this invention the chassis has a bottom surface and wherein the automated guided vehicle includes a switch located on the chassis adjacent the bottom surface configured to be engaged by the foot of a user to activate the vehicle.

In accordance with another preferred aspect of this invention the automated guided vehicle includes a laser scanner on the first section and a laser scanner on the second section, each of the scanners is configured to detect an obstruction on a portion of the paths and to prevent the automated guided vehicle from colliding with the obstruction.

In accordance with another preferred aspect of this invention the automated guided vehicle includes an indicator light, which when illuminated indicates the ready status of the automated guided vehicle.

In accordance with another preferred aspect of this invention the automated guided vehicle includes an audible alarm for providing an audible signal indicating the location of the automated guided vehicle.

In accordance with another preferred aspect of this invention the automated guided vehicle includes channels for receipt of the tines of a fork lift to lift the automated guided vehicle off of the ground surface.

In accordance with another preferred aspect of this invention a conveyor assembly is mounted on the top plate. The conveyor assembly is configured for supporting the cargo thereon and for moving the cargo from one position with respect to the top plate to another position with respect to the top plate.

In accordance with another preferred aspect of this invention the control and navigation circuitry comprises electronic components that are located on a board configured to be mounted on the intermediate section so that the electronic components are located within a hollow interior space in the intermediate section when the top plate is releasably mounted on the chassis. The board is configured to be removed from the intermediate section and oriented vertically to provide access to the electronic components when the top plate has been removed from the chassis.

In accordance with another preferred aspect of this invention the automated guided vehicle additionally comprises a coupler for releasably connecting a trailer hitch of a wheeled cart or wagon to said automated guided vehicle for towing by the automated guided vehicle.

In accordance with another preferred aspect of this invention the automated guided vehicle is configured for remote starting from a wireless remote.

Another aspect of this invention is an automated guided vehicle system comprising plural predetermined magnetic paths on a ground surface and a vehicle like that described above.

One preferred aspect of the automated guided vehicle system comprises paths that include a main section and at least one branch section extending in a direction away from a contiguous portion of the main section and a magnetic strip member of a different polarity than the polarity of the main section to enable the vehicle to roll from the main section onto the branch section under the control of the control and navigation circuitry.

Another preferred aspect of the automated guided vehicle system comprises use of a spool of stretch or shrink wrap material mounted for rotation about a vertical axis and located adjacent one of the selected points of the paths. The automated guided vehicle is configured to be rotated about a central vertical axis by the control and navigation circuitry, whereupon the stretch or shrink wrap material is unwound from the spool and wound about the cargo on the automated guided vehicle to secure the cargo in place.

DESCRIPTION OF THE DRAWING

FIG. 1 is an isometric view of one exemplary embodiment of an AGV constructed in accordance with this invention and for use in an automated guided vehicle system of this invention;

FIG. 2 is a top plan illustration of an automated guided vehicle system of this invention including plural AGV of this invention, showing various magnetic paths that the AGVs may take to bring them to various work stations in a factory;

DETAILED DESCRIPTION OF THE PREFERRED EMBODIMENT

Figure 3:
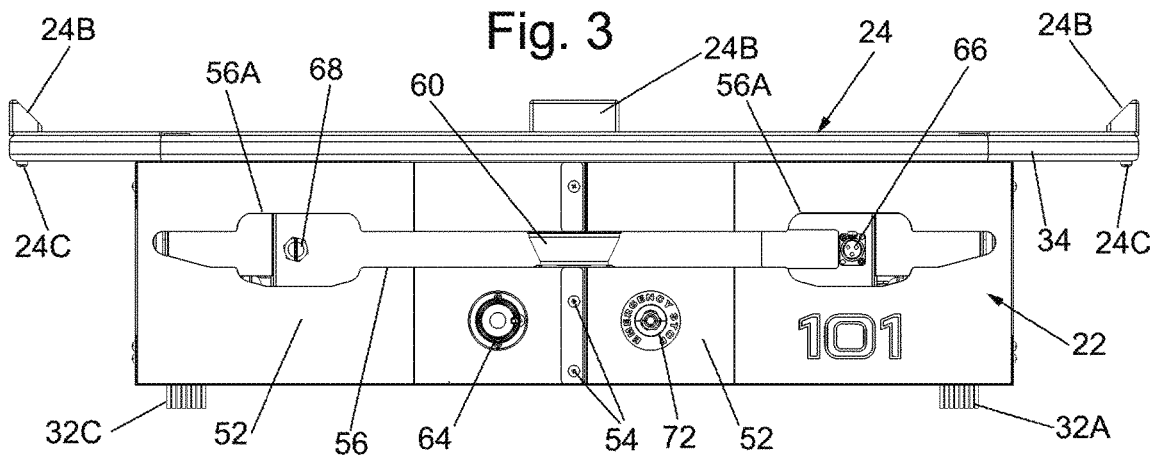
FIG. 3 is an enlarged front elevation view of the AGV shown in FIG. 1.

Referring now to the various figures of the drawing wherein like reference characters refer to like parts, there is shown in FIG. 1 one exemplary embodiment of an automated guided vehicle AGV 20 constructed in accordance with this invention. The AGV is particularly designed to increase the throughput in manufacturing and warehouse operations using factory transit robotics. To that end, the AGV is configured for transporting material (e.g., cargo) on a pallet or other commercial material handling fixture securely placed to the top of it to traverse magnetic tracks or paths on a ground surface of a facility, e.g., the floor of a factory, warehouse, etc., to carry the cargo to selected points or work stations. As is conventional, each of those work stations may include automated equipment or personnel for handling the cargo, e.g., assembling it, testing it, wrapping it, etc. It should be pointed out at this juncture that the AGV 20 may itself mount some piece of equipment, e.g., a robotic arm, for accomplishing some task at the station to which the AGV is brought, as is also conventional.

The construction and operation of the AGV 20 will be described in great detail later. Suffice it for now to state that the AGV includes a chassis or body 22, having a central longitudinal axis A and a top plate 24. The chassis 22 is made up of three sections, namely, a first section 22A, a second section 22B and a third section 22C. As will be described later the sections 22A and 22B are of similar construction so that they are modular, and the third section is located between the first and second sections, so that it forms an intermediate section. The top plate 24 is mounted on the chassis 22. The top plate 24 is configured to carry the cargo on a pallet or other material handling fixture on the AGV to selected points on the magnetic track. In some cases a piece of equipment, e.g., a robotic arm (not shown) may be mounted on the top plate so that the piece of equipment can be operated at any work station to perform some function thereat.

In order to move the AGV along the desired path, the chassis 22 incudes a pair of drive wheels 26A and 26B (FIGS. 3, 6-10 and 12), each of which is mounted on a respective axle. The axles are coaxial and fixedly secured to the chassis perpendicular to the central longitudinal axis A so that the drive wheels cannot move up or down with respect to the chassis. The drive wheels are configured to be rotated bi-directionally, i.e., in either a clockwise or counterclockwise direction, by respective electric drive motors 28A and 28B (FIGS. 6 and 8) acting through associated respective gear boxes 30A and 30B. Thus, the AGV can be moved either in a forward direction or in a rearward direction along the magnetic path. Each of the motors has a brake associated with it, which when activated causes the motor to immediately stop, whereupon the drive wheels stop rotating. In particular a brake 50A is coupled to the motor 28A, and a similar brake 50B is coupled to the motor 28B.

Figure 4:
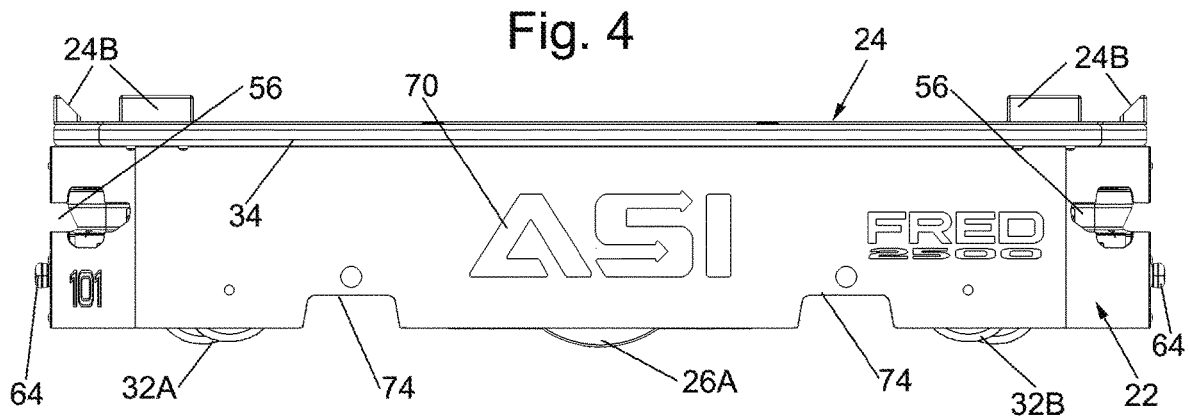
FIG. 4 is an enlarged side elevation view of the AGV shown in FIG. 1.
Figure 5:
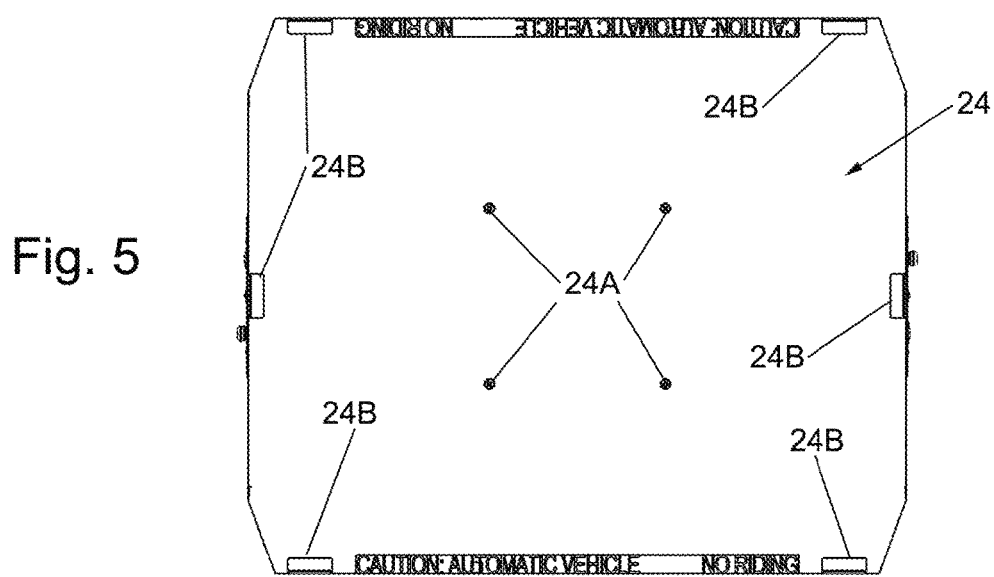
FIG. 5 is a slightly reduced top plan view of the AGV shown in FIG. 1.

The chassis 22 also includes four ganged omni-wheels 32A, 32B, 32C and 32D (FIGS. 4, 6, and 12), which are passive, i.e., not driven, and configured to roll in any direction across the ground surface, whereupon the AGV can follow a desired path over floor surfaces that may be uneven, e.g., include dips, without a problem. The control and operation of the AGV is effected by control and navigation circuitry 42 (to be described later) which is programmable, e.g., includes a microprocessor, etc., for operating the drive motors and controlling the path that the AGV will follow.

With the foregoing brief discussion of the AGV 20 having been accomplished, a brief discussion of the automated guide vehicle system 10 of which the AGV 20 is a component is in order. That system 10, also constitutes an aspect of this invention, and basically comprises a magnetic track or path 12 and at least one AGV 20. The magnetic path is located, e.g., mounted, on a floor or ground surface of the facility through which the AGV is to be moved. In FIG. 2 there is shown one exemplary automated guided vehicle system 10 out of a myriad of potential systems capable of being designed utilizing the subject invention. Thus, as can be seen the exemplary system 10 basically comprises a main magnetic path 12 which is in the form of a continuous loop, and two magnetic branch paths 12A and 12B which emanate from respective portions of the main magnetic path 12 and which ultimately merge back with the main magnetic path at respective junction points. One or more work stations are located adjacent respective points of the main magnetic path 12 and the branch magnetic paths 12A and 12B. In the exemplary embodiment shown the main magnetic path 12 includes a loading station 14A at which some cargo, e.g., a component to be assembled into a product, is loaded onto the AGV, and an unloading station 14B at which the cargo, e.g., the finally assembled product, is removed. The work stations 14C-14F are located adjacent respective points on the main magnetic path and each station is configured to provide some task with respect to the cargo carried by the AGVs to that station. In a similar manner, the work stations 14G and 14H are located adjacent respective points on the branch magnetic path 12A, with each of those work stations configured to provide some task with respect to the cargo carried by the AGVs to that station. So too, there is a work station 14I which is located at a point adjacent the magnetic branch path 12B for providing some task with respect to the cargo carried by the AGVs to that station.

The main and branch magnetic paths are each made up of a strip of magnetic tape of a first polarity e.g., south pole, facing upward adhesively secured on the ground surface. In the exemplary embodiment shown the main magnetic path 12 is in the form of a continuous loop which ultimately ends back at its starting point. Each AGV 20 includes a magnetic sensor 48, to be described later, which is configured to sense the magnetic strip to drive the AGV along the magnetic path and to stop it at any point therealong, e.g., a desired work station, according to the program of the microprocessor in the control and navigation circuitry 42. If the path includes one or more branch paths, like the embodiment shown in FIG. 2, onto which the AGVs may be required to turn, a switch marker 16 in the form of strip of magnetic tape of opposite polarity, i.e., north pole, is located and adhesively secured facing upward adjacent each point at which the branch magnetic path turns or diverts from the main magnetic path. Thus, when the AGV reaches the branch point the magnetic sensor in the AGV at the end of the AGV in the direction of travel will sense the opposite polarity of the switch marker strip 16. If a turn onto the branch path at which the switch marker 16 is located is to be made, the control and navigation circuitry will cause the drives motor associated with the drive wheels to operate to turn the AGV onto that branch path. For example, if the branch path is a right turn from the main path, such as the case of the branch path 12A, when the AGV 20 reaches the marker strip 16 at the juncture of the branch path 12A the control and navigation circuitry will cause the drive motor 28A and its associated gear box 30A to cause the drive wheel 26A on the left side of the AGV to rotate faster than motor 28B and its associated gear box 30B rotates the drive wheel 26B on the right side. Thus, the AGV will make a right turn into the right branch path 12A. The AGV will follow the branch path 12A until it reaches the main path 12, at which time it will turn back onto that branch path. It should be noted that if the layout of paths of FIG. 2 is different than that shown, e.g., there is another branch path emanating from the branch path 12A onto which the AGV is desired to turn another marker strip 16 would be located at that junction. The magnetic sensor in the AGV will sense the switch marker strip and provide a signal indicative thereof to the control and navigation circuitry, which in turn will provide electrical signals to the drive motors to drive the drive wheels as appropriate to cause the AGV to make the turn onto either the next branch path or back to the main path.

It must be pointed out at this juncture that the potential paths over which the AGV can traverse is strictly a matter of design for the particular application, e.g., the factory, warehouse, etc., through which various cargo is to be carried to various locations or work stations. As pointed out above, that path may be a single main path with a plurality of stops, e.g., work stations, therealong or may be a continuous path with branch paths emanating from the main path and going to various other locations which ultimately comes back to the main path. The main path may not be a continuous loop wherein the start point and the end point are the same. Instead, the main path may have a discrete start point and a discrete end point, which are not the same. Moreover, that main path may include possible branch paths from the main path between the start point and end point. In such a case when the vehicle reaches the end point it may be operated to reverse direction to bring it back to the start point since the AGV 20 is bi-directional. Further still, two paths can overlap at a crossing of 90 degrees and the AGV will remain on the same track over the crossing.

The switch marker strips 16 can be used as desired to indicate what a particular AGV is to do. The available actions of the AGV 20 include stopping, bearing left at an intersection, and bearing right at an intersection. In order to ensure proper operation the switch marker strips should be of a sufficient length, e.g., at least 12" long, to ensure that the AGV's magnetic sensor will read them properly. The microprocessor and associated memory of the control and navigation circuitry 42 is configured to remember the last switch marker seen. However, that circuitry will not remember markers if the power has been removed. Thus, a switch marker should preferably be placed just before each turn or merge to ensure the correct marker is read every time an action is needed, keeping in mind the direction of travels of the AGV. If the AGV is to move in both directions (i.e., bi-directionally) on the same track or path, the switch markers 16 will have to be placed accordingly. When first powered on the control and navigation circuitry 42 of the AGV 20 defaults to a right turn, unless a different marker is seen.

As will be described later, each AGV 20 is equipped with directional lighting to indicate it direction of travel. In particular, strips of LEDs are located in the chassis at each end to illuminate the ground in the direction that the AGV is heading. Moreover, the AGV includes an annunciator, e.g., a beeper, which provides a beeping sound when the AGV is moving. The beeping sound serves as audible warning that an AGV is in the vicinity so that personnel will be aware of its presence.

The chassis of the AGV 20 also includes a visual indicator indicating when the AGV 20 is powered on. That indicator is in the form of a logo bearing the letters "ASI" (a portion of the name of the assignee of this invention) which light up on either side of the chassis 22 when the AGV 20 is powered on.

The AGV 20 also includes a safety laser scanner 60 (to be described later) on each end of the chassis 22. Those two safety laser scanners form a portion of an obstacle detection system and are designed to detect a person or obstacle that is in the path that the AGV is travelling, i.e., within the line of sight of the laser scanner, and to provide a signal indicative thereof to the control and navigation circuitry 42. Upon receipt of such a signal the control and navigation circuitry 42 will actuate the AGV's brakes to immediately stop the motion of the AGV.

Turning now to FIGS. 1 and 3-5 the details of the top plate 24 will now be described. To that end, as can be seen the top plate comprises a generally planar member formed of any suitable material, e.g., steel, aluminum, etc. The top plate includes various fixturing holes 24A. The fixturing holes 24A are counter-sunk through-holes to accommodate threaded fasteners (not shown) to directly secure the top plate 24 onto the chassis 22, as will be described later. In addition, the fixturing holes 24A, may be used for accommodating threaded fasteners to mount any suitable type of fixture, e.g., a conveyor assembly (to be described later), on the top plate. In addition, the top plate includes six pallet guides 24B located at respective locations along the periphery of the top plate. The pallet guides 24B serve to center a conventional pallet 102 (FIG. 16) for holding cargo on the top plate 24.

The chassis 22 may include a top frame assembly 34 (FIGS. 3, 4 and 9) on which the top plate is mounted. If so the top plate 24 is not directly mounted on the sections 22A, 22B and 22C of the chassis, but instead is mounted on the top plate assembly 34, which in turn is mounted on the chassis sections 22A, 22B and 22C. In particular, the mounting of the top plate 24 on the top frame assembly 34 is achieved by use of threaded fasteners (not shown) extending through the holes 24A in the top plate into internally threaded holes 34A (FIG. 9) of the top frame assembly 34. The top plate assembly 34 is in turn secured to the chassis sections 22A, 22B and 22C by means, not shown.

Figure 9:
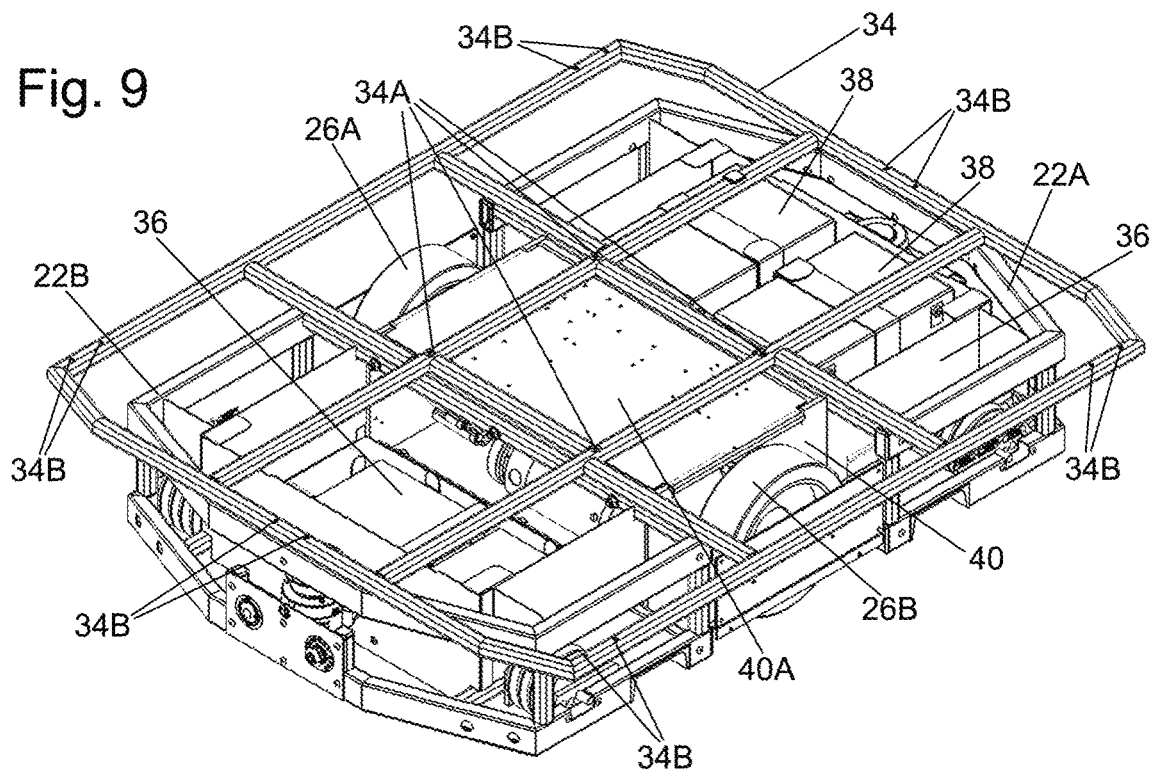
FIG. 9 is an isometric view similar to FIG. 8 showing a portion of a frame assembly for supporting the top plate on the chassis of the AGV.

As best seen in FIG. 9, the top frame assembly 34 also includes plural pairs of other holes 34B. One such pair is adjacent each of the corners of the top plate, with two other pairs centered about the axis A at each end of the top plate. Each of the holes 34B of each pair is configured to receive the threaded shank of a threaded fastener, e.g., a screw 24C (FIG. 3), through it so that the threaded end of the screw's shank is threadedly secured within a respective internally threaded hole in a respective pallet guide 24B. A plurality of small square foam pads (not shown) are interposed between the top plate and the top frame assembly to minimize vibration of the top plate when the AGV is in motion.

If the top plate 24 is mounted directly on the sections 22A, 22B and 22C of the chassis, which is preferred although not shown in the drawings, threaded fasteners, e.g., screws, are threaded through the fixturing holes 24A in the top plate 24 into internally threaded tapped holes 22D (FIG. 6) in the intermediate section 22C to thereby secure the top plate onto the chassis 22. In addition, a plurality of small square foam pads (not shown) are interposed between the top plate 24 and the chassis sections 22A, 22B and 22C to minimize vibration of the top plate when the AGV is in motion.

It should be pointed out at this juncture that if the AGV is constructed so that its top plate 24 is directed mounted onto the sections 22A, 22B and 22C of the chassis, the top plate 24 will still include the pallet guides 24B, like shown in FIG. 1.

As mentioned earlier and as best seen in FIGS. 6, 7, 9, 10 and 12, the chassis 22 basically comprises two modular frame sections 22A and 22B, and an intermediate frame section 22C located between the frame sections 22A and 22B. The frame sections 22A, 22B and 22C together form the sub-frame of the chassis 22. The modular frame sections 22A and 22B are identical in construction and each includes a box-like chamber or cradle 36 within its interior. In the exemplary embodiment shown the cradle 36 in the section 22A serves to hold a pair of electrical batteries 38 to provide electric power to the AGV 20. The cradle 36 in the section 22B can be used to hold anything. In fact, if desired, the cradle 36 of section 22A may be used to house additional batteries for powering the AGV 20. The sub-frame of the chassis at section 22A includes a floor panel 36A. Since the sections 22A and 22B are modular, the sub-frame of the chassis at section 22B also includes a floor panel 36A.

Figure 12:
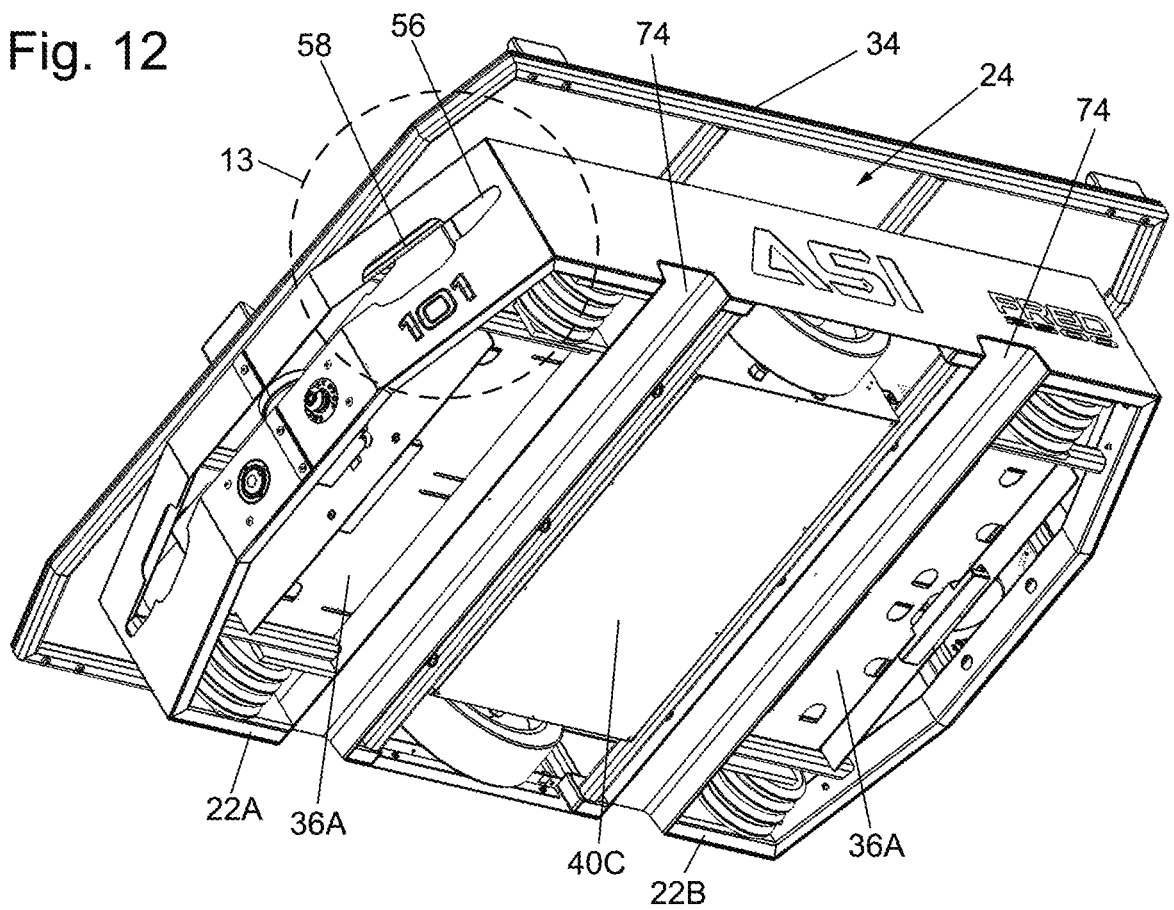
FIG. 12 is an isometric view showing the underside of the AGV shown in FIG. 1.

The intermediate section 22C to which the top frame assembly bolts includes a box-like chamber or cradle 40. The box-like chamber or cradle 40 serves to hold the motors 28A and 28B, the brakes 50A and 50B, the gear boxes 30A and 30B and the electronic and electrical components making up the control and navigation circuitry 42. In particular, the cradle 40 includes a removable lid or panel 40A having an underside surface on which the electrical and electronic components of the control and navigation circuitry 42 are mounted. The panel 40A is configured to be oriented so that in normal use it is horizontal, like shown in FIG. 7, whereupon the control and navigation circuitry 42 is located within the cradle 40. Thus, when the panel 40A is closed the cradle effectively becomes the electronics box for the AGV. The panel 40A is configured so that it can be removed and placed in two vertically oriented slots 40B in the chamber 40, so that the panel 40A is oriented vertically like shown in FIGS. 6 and 8 to provide access to the control and navigation circuitry 42, to the motors 28A and 28B, the gear boxes 30A and 30B and the brakes 50A and 50B for servicing thereof. The underside of the cradle 40 is in the form of a flat panel 40C (FIG. 12).

Figure 7:
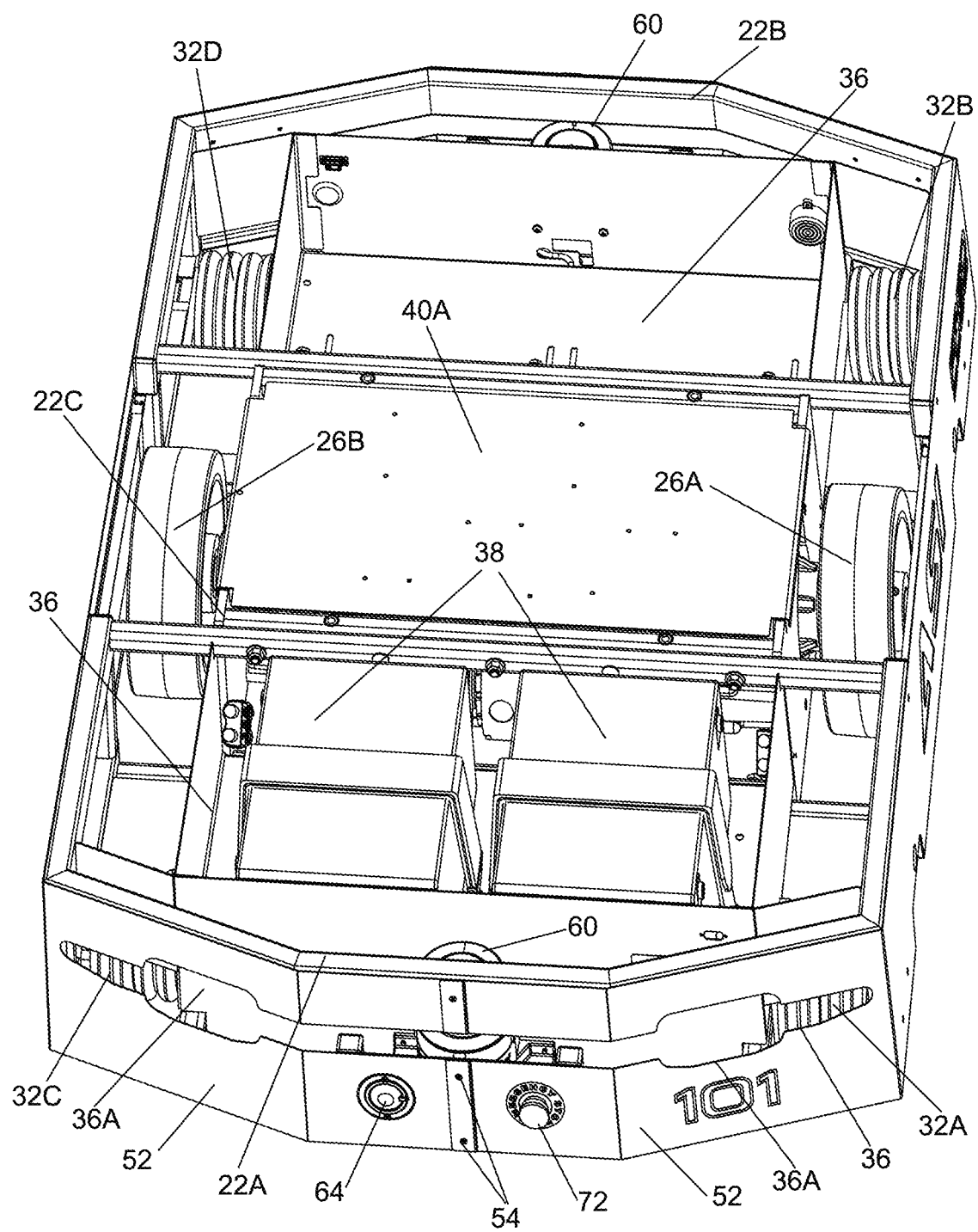
FIG. 7 is an enlarged isometric view of the AGV shown in FIG. 1, but with its top plate removed to show its chassis.

As best seen in FIGS. 1, 3 and 7 the sub-frame of the chassis is covered by two identical body panels 52 which are secured together and to the sub-frame by plural threaded fasteners 54. The connected body panels at each end of the chassis include an elongated window 56 extending thereacross. The window includes enlarged area portions 56A which enable one to gain access into the chassis through the enlarged windows.

Figure 11:
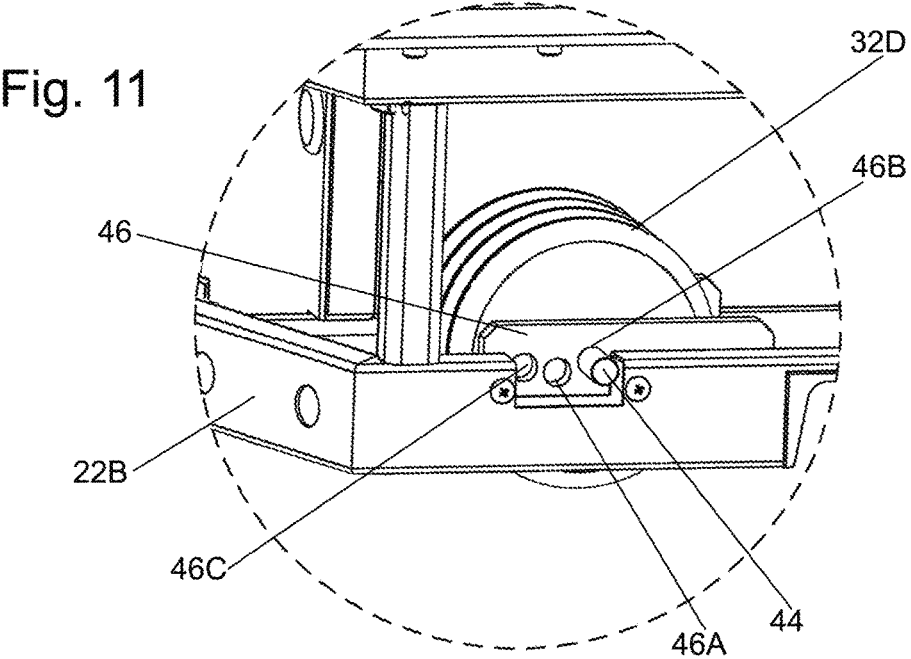
FIG. 11 is an enlarged isometric view of the portion of the AGV shown within the broken circle designated with the reference number 11 in FIG. 10, to show the manner of adjusting some of the omni-wheels of the AGV.
Figure 14:
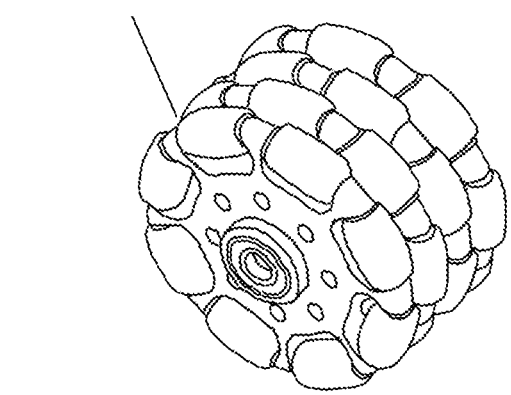
FIG. 14 is an enlarged isometric view of one of the omni-wheels of the AGV.

As shown in FIGS. 11 and 14, each of the omni-wheels 32A, 32B, 32C and 32D is configured to be rotated about a respective stationary (fixed) axle 44 which extends perpendicularly to the longitudinal axis A. Yet, owning to the construction of the omni-wheels, each can roll omni-directionally across the ground surface and thus perform the function of a caster. However, unlike a caster which is prone to "kick" when it is aimed in the opposite direction from the direction the caster is to be moved, the omni-wheel will easily and smoothly change direction without any tendency to kick. Moreover, the axle 44 of each of the omni-wheels is configured to be adjusted in height with respect to the ground surface so that the AGV can be used on floor surface paths that are not perfectly smooth, e.g., have some dips or depressions. In so doing, the AGV can rock front-to-back about the coaxial axis of the drive wheels 28A and 28B, whereupon the drive wheels will always engage the floor surface. To that end, as best seen in FIG. 11, the each modular section 22A and 22B includes a pair of axle mounting plates 46, each in a respective corner of the modular section. Each plate 46 includes three holes 46A, 46B, and 46C in it for respective receipt of the axle 44 of the omni-wheel that is mounted at that corner of the modular section. The hole 46A is located closest to the undersurface of the chassis section in which the plate 44 is mounted. The hole 46B is located furthest from that undersurface and the hole 46C is located intermediate the holes 46A and 46B.

Figure 10:
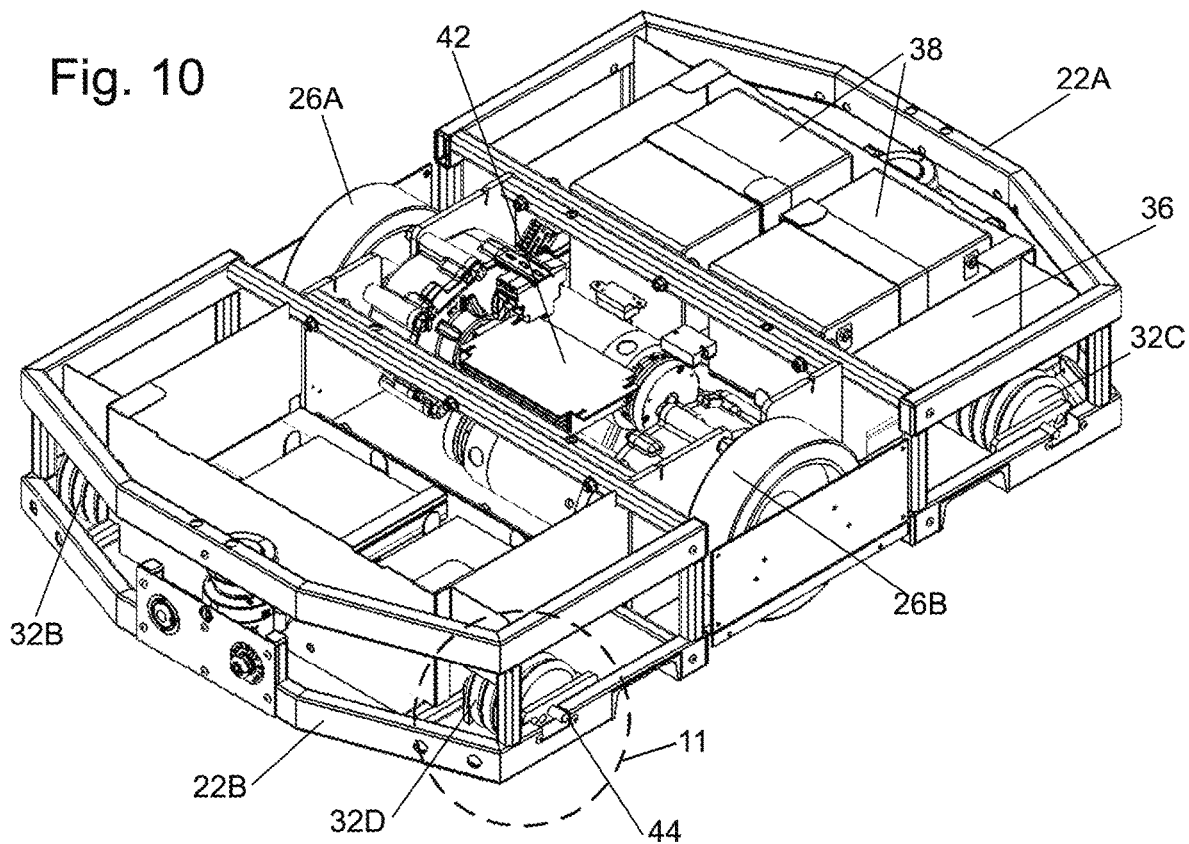
FIG. 10 is an isometric view similar to FIG. 9 but with the frame assembly for supporting the top plate removed.

If the ground surface along which the path or track is disposed is uneven to the point that it includes at least one substantial dip or depression, the axle 44 of each of the omni-wheels should be located within the upper hole 46B. In particular, as shown in FIGS. 10 and 11, the axle 44 of the omni-wheel 32D of the chassis section 22B should be located in in the hole 46B in the plate 46 in one corner of the section 22B and the axle 44 of the omni-wheel 32B should be located in the hole 46B in the plate in the opposite corner of that modular section. Similarly, the axle 44 of the omni-wheel 32C should be located in the hole 46B in the plate 46 in one corner of the section 22A and the axle 44 of the omni-wheel 32A should be located in the hole 46B in the plate 46 in the opposite corner of the section 22A. As such all of the omni-wheel 32A-32D will extend out of the undersurface of chassis by the least distance allowable, thereby allowing the AGV to rock substantially about the axis of the drive wheels, if necessary so that the drive wheels will engage the surface of any deep depression in the floor and will not "free wheel" (i.e., spin freely). Accordingly, the AGV will not hang up or stall when it reaches that dip or depression, as could be the case if the omni-wheels extended further out of the chassis, since that action could result in the drive wheels being held out of engagement with the surface of the depression.

If the floor or ground surface on which the path the AGV 20 is to traverse is very flat or even, the omni-wheels should be positioned so that their axles are located within the lowermost of the holes 46A in the plates 46. For floor surfaces that are not quite even or flat, yet without substantially deep depressions, the omni-wheels should be placed in the intermediate holes 46C in the plates 46.

It should be noted that depending upon the condition of the floor or ground surface upon which the AGV 20 is to roll, all of the omni-wheels need not be located in the same holes. Thus, the omni-wheel in each corner of the chassis may be located in particular hole for accommodating the topography of the floor or ground surface upon which the paths extend.

Figure 13:
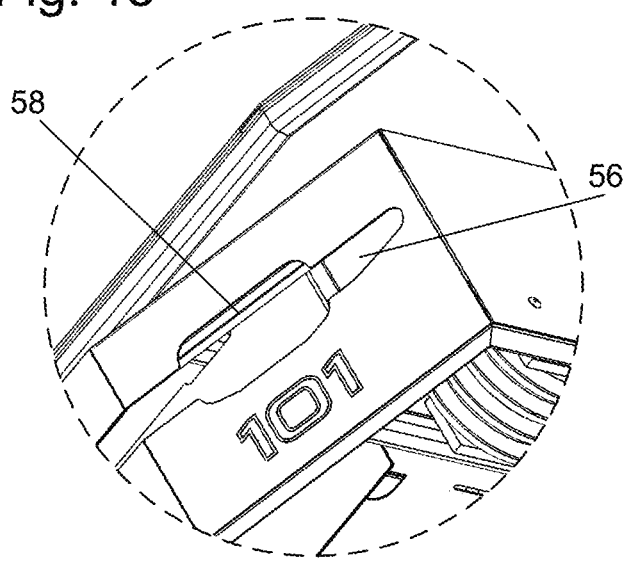
FIG. 13 is an enlarged isometric view of the portion of the AGV shown within the broken circle designated with the reference number 13 in FIG. 12.

As mentioned earlier, the AGV 20 includes bi-directional lighting to indicate the direction of travel along the magnetic track or path. The bi-directional lighting is in the form of strips of LEDs located at each end of the chassis 22. In particular, as best seen in FIG. 13, a strip or string 58 of blue LEDs is mounted within the chassis section 22A at one side of window 56. A similar strip of blue LEDs is mounted within the chassis section 22A at the opposite side of that window 56. In a similar manner a strip 58 of blue LEDs is mounted within the chassis section 22B at one side of window 56, and a similar strip of blue LEDs is mounted within the chassis section 22B at the opposite side of that window 56. If the AGV 20 is moving in the direction wherein the chassis section 22A is facing in the direction of travel, the LED strip 58 in that chassis section will illuminate, so that blue light will project out of the chassis section 22A and onto the ground, thereby indicating the direction of forward travel of the AGV. Conversely, if the AGV is moving in the direction wherein the chassis section 22B is facing the direction of travel, the LED strips 58 in that chassis section will illuminate.

Figure 6:
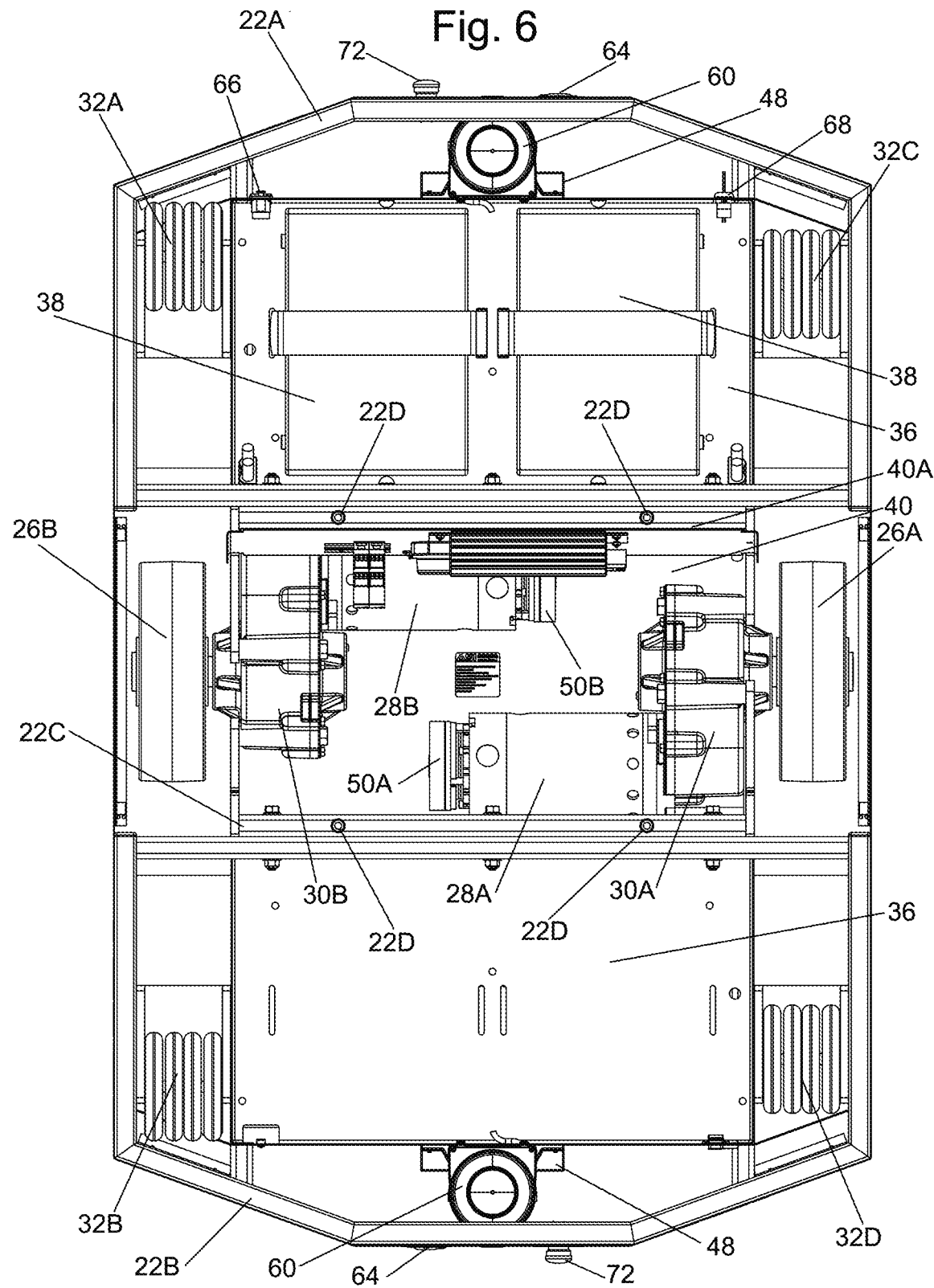
FIG. 6 is an enlarged top plan view of the AGV shown in FIG. 1, but with its top plate removed to show its chassis.

As also mentioned earlier the AGV 20 includes an obstacle detection system configured to detect an obstacle in the path of the AGV. In particular, as best seen in FIGS. 3, 6 and 7, a laser scanner 60 is mounted in the chassis section 22A immediately adjacent the center of its window 36. A similar laser scanner 60 is mounted in the chassis section 22B immediately adjacent the center of its window 36. The laser scanners are coupled to the control and navigation circuitry 42 and are configured to receive electrical signals therefrom and provide electrical signals thereto. When activated by the control and navigation circuitry each laser scanner will to project a non-visible laser beam outward from the end of the chassis at which it is located. That non-visible laser beam will be reflected off of any person or obstacle in the line of sight back to the scanner, which provides an electrical signal to the control and navigation circuitry. Thus, for example, if a person is detected in the direction that the AGV 20 is traveling the control and navigation circuitry will cause the AGV to stop and wait for the person to move. Moreover, if someone or something is detected as being in the path of the AGV the directional lighting, e.g., the blue LED strips 58, will blink to indicate that occurrence. Further still, if the AGV is stopped for more than five seconds the control and navigation circuitry 42 will cause the beeper to produce a double beep to alert unaware personnel that they may be blocking the AGV, or to call out for help if the path is blocked. The control and navigation circuitry 42 is configured to provide approximately a two second delay between when the AGV no longer senses an object in its path and when it starts moving again. It should be noted that only the laser scanner in the direction that the AGV is moving is active. This prevents the AGV from presenting a tripping hazard if walked behind.

As best seen in FIG. 6 one of the heretofore identified magnetic sensors 48 is mounted in the chassis section 22A below the laser scanner 60 so that it overlies the magnetic path 12. The magnetic sensor 48 is coupled to the control and navigation circuitry 42 to provide a signal thereto indicating the sensing of the magnetic tape path and its polarity. Another identical magnetic sensor 48 is mounted in the section 22B below the laser scanner 60 in that section and is also coupled to the control and navigation circuitry 42.

Turning now to FIGS. 3 and 6, it can be seen that the AGV 20 includes a small kick button switch 64 on either end of the chassis. Pressing the switch 64 will cause the AGV 20 to start to move away from the end of the chassis where the button was pressed. The kick button is located so that it can conveniently be kicked by a user's foot when desired. The annunciator (beeper) in the AGV 20 will beep a number of times when the button 64 is pressed (kicked) to let the user know that his/her command is understood and to communicate information about battery life. In particular, the beeper will emit one beep if the charge in the batteries 38 is good and there is no need to charge them. If the beeper emits two beeps that action indicates that the charge in the batteries is getting low and that they should be charged at next opportunity. If the beeper emits three beeps those beeps indicate that the charge in the batteries is dangerously low and that they should be charged immediately. The batteries are configured to be charged via a charging port 66. The charging port is located immediately behind the enlarged portion 56A of the window 56 at the chassis section 22A and includes a latch which is configured to be pushed to open it, whereupon a charging cable (not shown) can be pulled out to charge the batteries. The charging cable is configured to be plugged into a typical 120 V AC wall outlet, and then into the charging port until the release clicks.

The charger system of the AGV 20 also includes LEDs that will illuminate with in one of the following manners. If the LEDs blink orange that indicates deep charging is necessary (e.g., when the battery has been discharged below 5 volts). If this occurs one should charge batteries more frequently. If the LEDs are illuminated as solid orange, that indicates normal charging. If the LEDs are illuminated as solid green, this indicates that charge is complete. If the LEDs are illuminated as solid red this indicates a fault condition, e.g., the fault indicator LED communicates that the batteries have been charging for a sufficient amount of time but have not reached full charge. This could indicate that the batteries are nearing the end of their life. When charging is complete the AGV 20 can be used immediately or left on the charger to maintain the battery charge. The charging cable should be removed before using the AGV 20. This is accomplished by pushing the release latch on the top of the charging port and then pulling the charging cable out.

The AGV 20 is configured to be turned on (powered up) via a key lock switch 68 that is located immediately behind the other enlarged portion of window 36 of chassis section 22A. The key lock switch 58 is configured to receive a key, which when turned to an "on" position results in the AGV being powered up. When the key of the key lock switch is turned to an "off" position the key can be removed. The key lock switch also includes a "neutral brake off" position, whereupon when the key is rotated to that position, the AGV's brakes are released so that the AGV can be manually pushed to a desired position. When the key is in the on position all operating systems of the AGV will be enabled.

As mentioned earlier the AGV includes lighting to indicate that it is in the on or active state and ready to move. In particular, each of the body panels 52 includes the transparent logo 70 bearing the letters "ASI", with lighting located within the chassis adjacent the transparent logo. Accordingly, when the key lock switch 68 is turned to the on position, the logo ASI will illuminate.

An emergency stop button 72 is provided at each end of the chassis 22 adjacent the kick button 64. The emergency stop button is configured so that pressing it (e.g., kicking it) will cause the control and navigation circuitry 42 to deactivate the AGV and cause its brakes to function so that the AGV will immediately stop moving. The emergency stop button is configured to be disengaged by manually rotating it, whereupon it will be released so that the AGV can start to move again.

Figure 8:
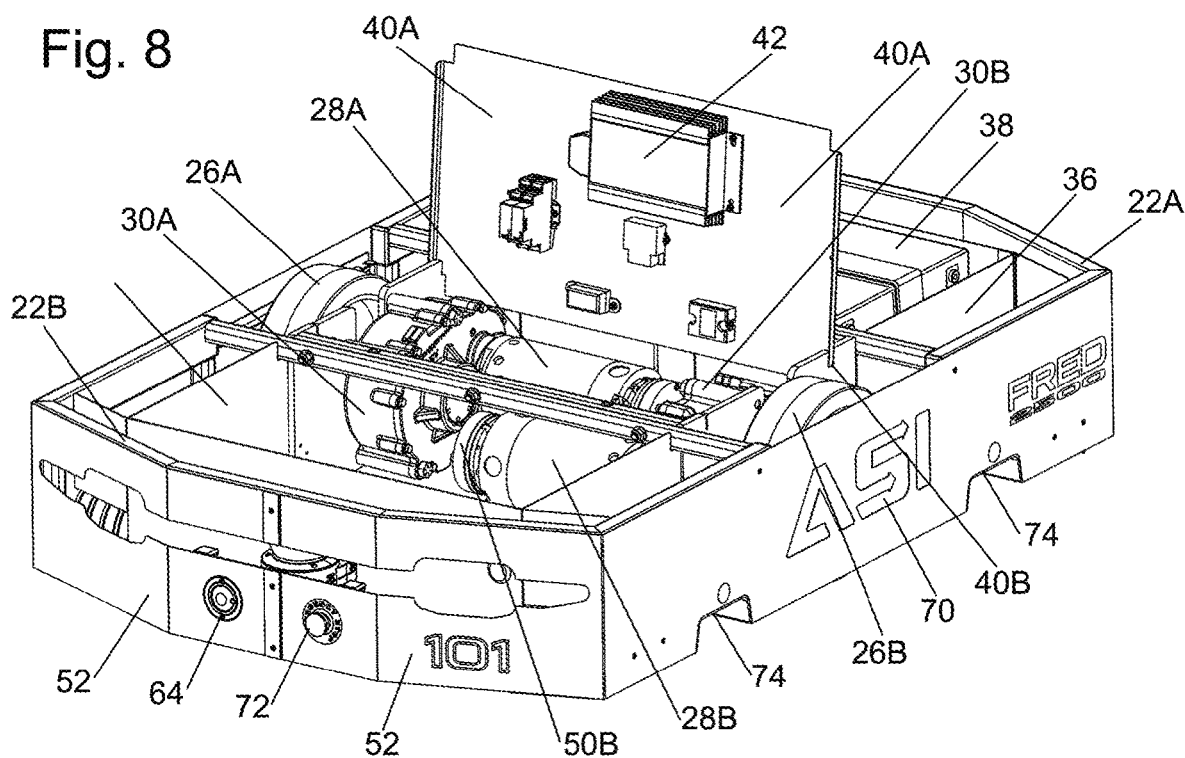
FIG. 8 is an isometric view of the chassis of the AGV shown in FIG. 1, but with the top plate removed and with plate on which various electronics components of the vehicle are mounted, shown in a state to provide ready access to those components and to other components of the AGV.

While not shown, there is a main power fuse located inside of the chassis under the top plate and inside the electronics box. This fuse protects the AGV in case there is an unusually large power draw in the system. As mentioned earlier, the electronics panel can be accessed by removing the top plate and lifting the top of the electronics panel 40A up as shown in FIG. 8. There is also a charging fuse located right behind the charging port. This fuse protects the AGV in case an unexpected current is applied to the battery.

It should be pointed out at this juncture that the gear boxes 30A and 30B can be of conventional construction, or may utilize new gearing technology, such as that disclosed in U.S. Published Patent Application 2017/0167589 entitled "Conjugate Gears With Continuous Tooth Flank Contact", whose disclosure is incorporated by reference herein.

Commercial embodiments of that alternative gear technology are sold under the trademark CONVOLOID2. Use of such alternative gear technology in the gear boxes 30A and 30B, should lower the costs of production of the AGV and produce the same power ratings in a considerably smaller, e.g., 25% to 30%, space. Accordingly, an AGV making use of such alternative gear technology can provide more room in the power section of the AGV for additional electronics and other features and could possibly reduce the cost of the AGV by enabling one to utilize smaller motors.

Turning now to FIG. 12, it can be seen that the chassis 22 includes a pair of channels 74 which extend transversely across the bottom of in the respective modular sections 22A and 22B. The channels 74 are configured to receive respective tines of a fork lift (not shown). To that end, the channels 74 are preferably separated by a distance of 23.5" measured center-to-center to accommodate the tines of a conventional fork lift. Thus, the AGV 20 can be lifted and transported to and from the track or path by any fork lift vehicle. For example, upon first use of the AGV 20, it can be removed from its crate and once free of the crate it can be lifted by fork lift using the two fork lift channels 74 to carry the AGV to the track or path 12.

FIG. 14 shows the omni-wheels 32A/32B/32C/32D, which are preferably available from Rotacaster under the model designation R2-1258-95/S13. In the exemplary embodiment each of the omni-wheels includes four omni-wheels which are ganged together for mounting on a common axle 44. While the disclosed embodiment of each of the omni-wheels of the AGV 20 are in the form of four ganged omni-wheels, that is merely exemplary. Thus, any number of omni-wheels can be ganged together depending upon the width desired for a particular application. Moreover, omni-wheels from other manufacturers are contemplated for use in the AGV 20.

It should be noted that the AGV 20 can accommodate custom fixturing on the top plate 24 for specialized cargo, fixtures or equipment. To that end, fixtures should preferably mount using the ⅜"-16 UNC-28 threads on a 14.00"×14.00" square bolt pattern. Moreover, any fixture or payload's center of mass should be within three inches of the center point.

Figure 15:
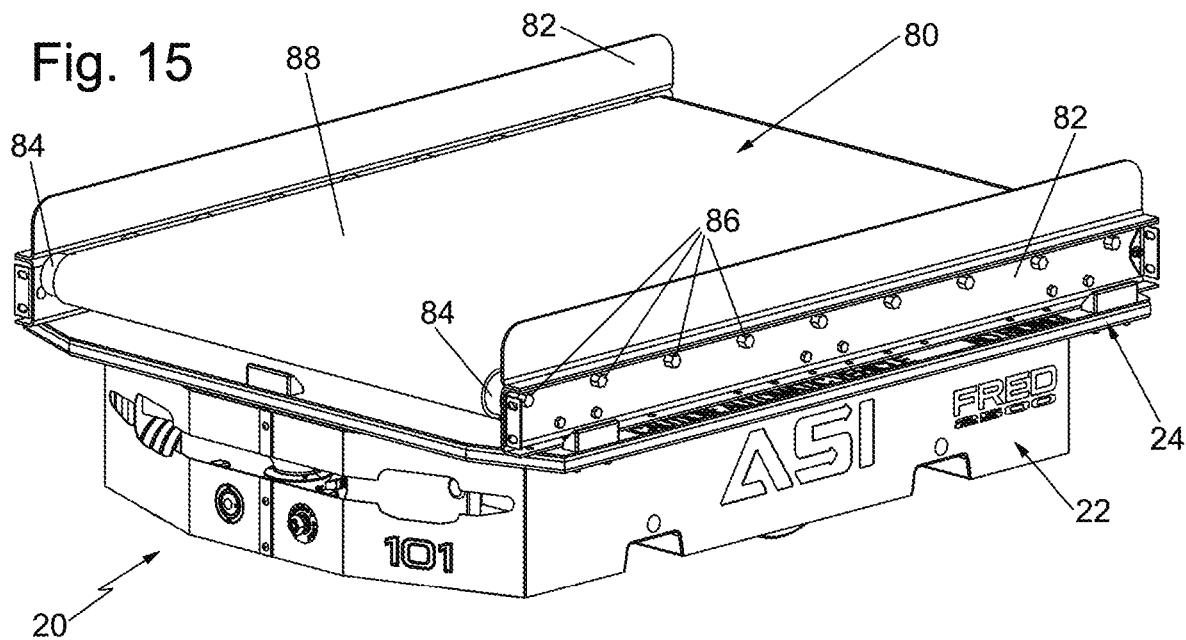
FIG. 15 is an isometric view similar to FIG. 1, but showing the AGV equipped with a conveyor system on its top plate.

It is also contemplated that a conveyor system be mounted on the top plate 24 to facilitate the moving of cargo or equipment from one position on the top plate to another position. To that end, attention is directed to FIG. 15, wherein one exemplary embodiment of a conveyor system 80 is shown mounted on the top plate of the AGV 20. The conveyor system 80 basically comprises a pair of side rails 82 extending the length of the top plate on each side thereof. A plurality of elongated rollers 84 (only one of which can be seen) extend transversely to the axis A between the side rails 82. Each roller is journaled on a respective axle 86 extending between the side rails, so that each roller can rotate about the axis of the axle. A continuous web or belt 88 of any suitable flexible material, rubber, woven metal, woven plastic, etc., extends about the rollers to form a surface on which the cargo can be placed and moved along the conveyor by the rotation of the rollers. While the exemplary embodiment of the conveyor system shown in FIG. 16 makes use of a belt surrounding the rollers, that conveyor system is merely one example exemplary of various conveyor systems that can be used with this invention. For example, the conveyor system 80 need not include a belt. It may just consist of powered or unpowered rollers. In any case, if the system makes use of powered rollers, they can be powered from a motor, not shown. Thus, it should be pointed appreciated by those skilled in the art that the exemplary embodiment of the conveyor system 80 of this invention shown and described above, is merely one of a large number of conveyor systems that could be mounted on the top plate or be a substitute for the top plate.

Figure 16:
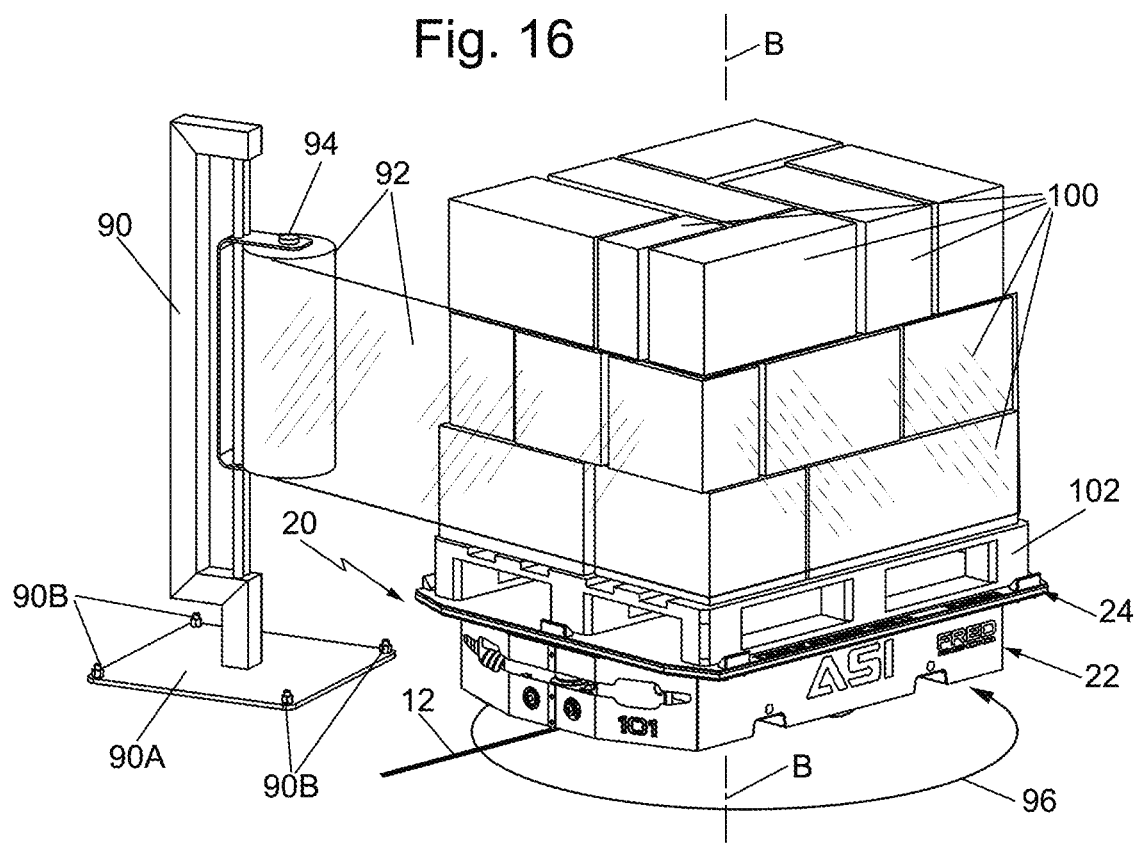
FIG. 16 is an isometric view of a portion of an exemplary automated guided vehicle system constructed in accordance with this invention wherein the AGV is shown adjacent a station mounting a reel of shrink wrap material, whereupon the vehicle is rotated about a central vertical axis of the AGV to wrap the shrink wrap material about cargo on the AGV.

Turning now to FIG. 16, there is shown a work station forming a portion of the system 20 at which cargo, e.g., boxes 100, on a pallet 102 on the AGV 20 can be wrapped with a stretch wrap or shrink wrap material. In particular, the work station shown includes a fixture 90 having a reel 92 of a stretch wrap plastic film or a shrink wrap plastic film mounted for rotation about a vertical axle 94. The fixture 90 includes a base 90A that may be secured to the floor surface adjacent the track, by any suitable means, e.g., fasteners 90B, or may merely be disposed on the floor. In any case, the reel can be moved up and down the axle to various heights therealong. In use, the AGV 20 with the cargo thereon to be wrapped is brought to the station, and a free end of the web of film 92 is brought into engagement with a portion of the cargo on the pallet. The AGV is then operated to cause its drive wheels to rotate the AGV about a central vertical axis B in the direction of the arrow 96, thereby unwinding the film from the reel and wrapping it about the cargo. Once wrapped, if the film is shrink wrap file, it can be heat shrunk to secure the cargo in place on the pallet. If the film is stretch wrap film, the operation of wrapping about the cargo will stretch the film so that it securely holds the cargo in place. It should be pointed out at this juncture, that instead of making use of a fixture 90 to hold the reel 92 of stretch wrap or shrink wrap film, that reel can be hand held by an operator.

Figure 17:
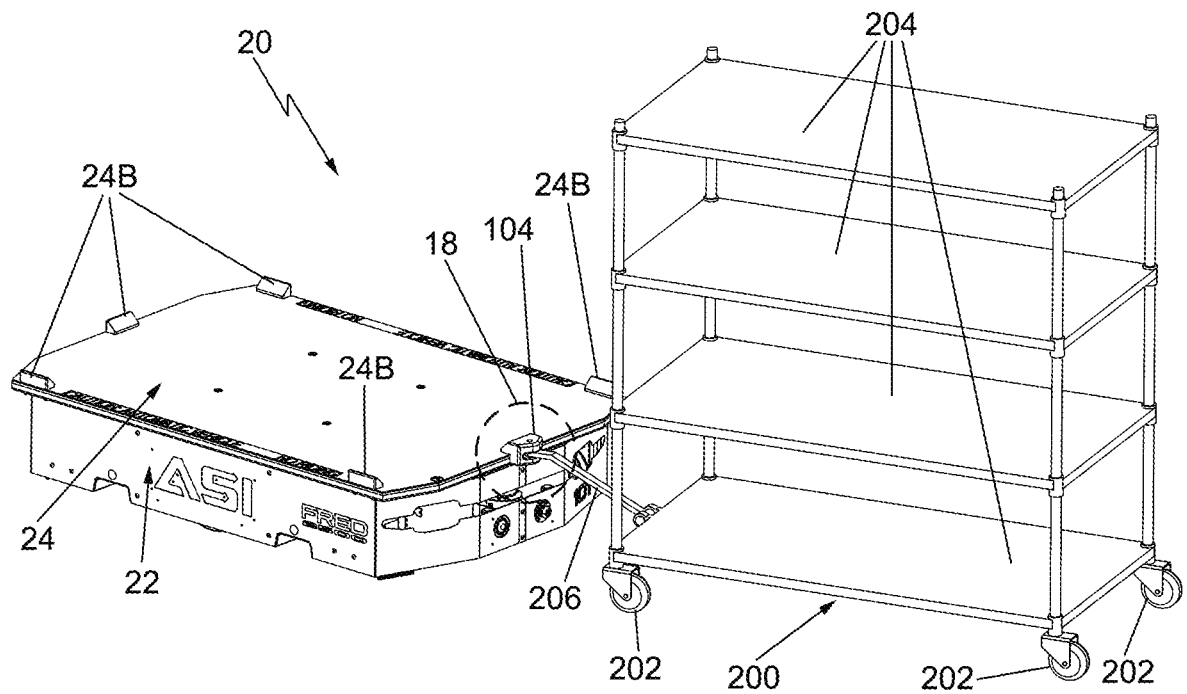
FIG. 17 is an isometric view showing the AGV of FIG. 1 for pulling a wheeled cart along the magnetic path or track.
Figure 18:
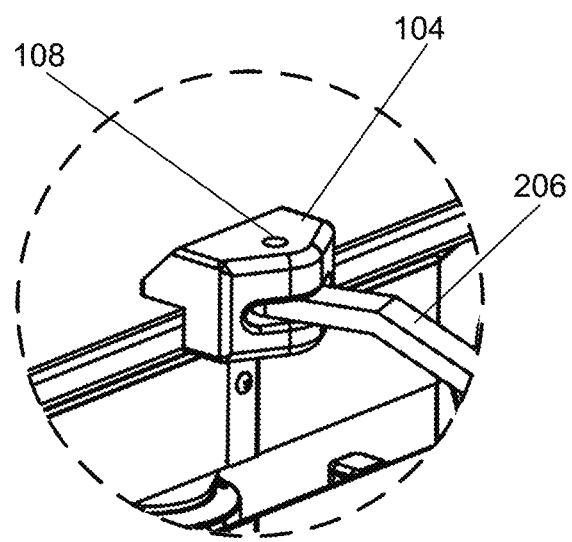
FIG. 18 is an enlarged isometric view of the portion of the AGV shown within the broken circle designated with the reference number 18 in FIG. 17.

The AGV 20 can also be used in what can be referred to as a "tugger" mode wherein it is used to pull or tow one or more wheeled carts or wagons behind it, like a locomotive of a train. One such exemplary embodiment of an AGV of this invention configured for use in a tugger mode is shown in FIG. 17. In that embodiment the pallet guide 24B which would be located on the central longitudinal axis of the AGV 20 at what would be the rear or trailing end of the AGV is replaced by an adaptor or coupler 104. The coupler 104 is configured for releasable securement to a trailer hitch of a wheeled cart 200. When so connected the wheeled cart 200 can be pulled by the AGV along the magnetic path. The cart 200 is exemplary of numerous carts that can be used with the AGV in the tugger mode. To that end, the cart 200 includes plural wheels or casters 202 and at least one, but preferably plural, shelves 204. The front end of the cart 200 includes a trailer hitch 206. The particular embodiment of the trailer hitch 206 shown is in the form of a clevis-type hitch or a ring-type hitch having a free end which includes a hole (not shown) configured to releasably receive a pivot pin 108 (FIG. 18) of the coupler 104. It should be noted that the coupler 104 and the trailer hitch 206, can be of any suitable construction to releasably connect any type of cart or wagon to the AGV 20 so that it can be towed along the magnetic path. Moreover, while the coupler 104 is shown as being a replacement for a pallet guide 24B, that is merely exemplary of various manners for connecting a cart or wagon to the AGV 20. Thus, chassis 22 may be constructed to include any type of coupler for releasably securement to any type of trailer hitch at one end of the AGV chassis. In fact, it is contemplated that an AGV of this invention may include a coupler for releasable securement to a trailer hitch at each end of the AGV. Irrespective of the arrangement to the coupler and trailer hitch, when used in the tugger mode the AGV can carry its own load or cargo on its top plate, while other cargo is carried by the wheeled cart/wagon, or the AGV 20 may be used merely to pull the wheeled wagon/cart, with the cargo only being on the cart/wagon. Moreover, an AGV constructed in accordance with this equipment for use in a tugger mode can be used to pull a string or series of wheeled carts/wagons instead of merely towing a single cart or wagon. Further still, if the AGV includes trailer hitches at both ends for operating in a tugger mode it is preferred that the AGV should include a start button 64 on each end of the chassis 22 so that it can be started from the opposite end of the chassis to which the wheeled cart(s)/wagon(s) is/are connected. That said, it should be appreciated by those skilled in the art that if the AGV is configured so that it only includes a coupler at one end of the AGV, the coupler should be located at the end of the AGV which is located opposite the end of the AGV at which the start button 64 is located.

As should be appreciated by those skilled in the art, the particular 5 AGV 20 as disclosed and described above and its method of use and the system of which it is a part is merely exemplary of various AGV, systems and methods of use that can be constructed in accordance with this invention. Thus, various modifications can be made to the system and its components. By way of example, and not limitation, the chassis may be a one piece construction in lieu of using sub-chassis construction shown and described above. Moreover, the AGV may be configured for remote starting, e.g., similar to a remote start to load the pallet 102 with its cargo on the top plate of the AGV 20 to start the AGV using a wireless remote while still seated or standing on the fork lift vehicle, thus obviating the need for the operator to get off of the fork lift vehicle to kick the start button. To that end, the control and navigation circuitry 42 may include a remote starter (not shown) configured to receive a wireless signal from a wireless remote 10 (FIG. 2), whereupon in response to receipt of the wireless signal, the AGV is energized like that which is accomplished by kicking the kick switch 64, but without requiring operation of that switch.

It is also contemplated that the system 10 be configured to effect the wireless charging of the AGV's batteries. Such charging can be accomplished using any suitable wireless charging technique, e.g., inductive charging, radio charging and resonance charging. Most of today's wireless chargers use inductive charging which transmit and receive coils in close proximity. Larger batteries for electric vehicles typically use resonance charging using coil "ring." Irrespective of the type of wireless charging chosen, a charging plate or coil (not shown) is preferably located in the floor immediately adjacent a point on the magnetic path 12, so that the AGV 20 can be brought to that point and stopped, whereupon electromagnetic energy can be transmitted wirelessly to associated electrical components in the chassis of the AGV to charge the AGV's batteries.

Insofar as alternative uses of the system 10 are concerned, it is contemplated that the AGV 20, whether operating in a normal mode or in its tugger mode, may traverse the path in what may be called a "bus route" mode. When operating in a bus route mode the AGV will follow a path as programmed into its control and navigation circuitry, but will stop at various positions along the path that are established separate and apart from the programming of the control and navigation circuitry. In particular, in the bus route mode the system 20 will make use of the obstacle detection features of the AGV 20 to stop the AGV at a desired point on the path or track. That action can be readily accomplished by placing a cone or other warning structure on the magnetic path 12 at a point the AGV is desired to stop, e.g., a loading or unloading station. In such a case, when the laser scanner of the AGV detects that cone or warning structure in its path, the AGV will stop as described earlier and will remain stopped as long as that cone or warning structure is blocking the path. Accordingly, the AGV can then be loaded or unloaded. Once that has been accomplished the cone or warning structure can be removed, so that the AGV can restart moving along the path.

Moreover, it should be appreciated that without further elaboration the foregoing will so fully illustrate our invention that others may, by applying current or future knowledge, adopt the same for use under various conditions of service.

We claim:

1. An automated guided vehicle for navigating and bidirectionally traversing magnetic paths on a ground surface to carry cargo to selected points on the paths, said paths comprising a strip of magnetic material of a first polarity facing upward from the ground surface, said automated guided vehicle comprising:

a chassis having a longitudinal central axis, a first section, a second section, and an intermediate section between said first and second sections, said first section including at least one first passive omni-wheel rotatable about a fixed horizontal axis extending perpendicular to said central longitudinal axis but able to roll omni-directionally over the ground surface without rotating about a vertical axis, said second section including at least one second passive omni-wheel rotatable about a fixed horizontal axis extending perpendicular to said central longitudinal axis but able to roll omni-directionally over the ground surface without rotating about a vertical axis, a first drive wheel located at said intermediate section and rotatable about a first transverse axis extending perpendicularly to said central longitudinal axis, a first motor coupled to said first drive wheel for rotating said first drive wheel about said first transverse axis to cause said first drive wheel to roll along the ground surface, a second drive wheel located at said intermediate section and rotatable about a second transverse axis extending perpendicularly to said central longitudinal axis, a second motor coupled to said second drive wheel for rotating said second drive wheel about said second transverse axis to cause said second drive wheel to roll along the ground surface;

a top plate mounted on said chassis to support a cargo item or piece of equipment thereon;

control and navigation circuitry including a magnetic sensor for sensing said strip of magnetic material and for operating said first and second motors to cause said vehicle to roll over the ground surface and along a desired one of said paths, said desired one of said paths being established by said control and navigation circuitry, whereupon said automated guided vehicle is selectively moved to selected ones of said points under the control of said control and navigation circuitry; and a source of illumination providing illumination adjacent said first section when said automated guided vehicle is moving in one direction along the paths and providing illumination adjacent said second section when said automated guided vehicle is moving in an opposite direction along said paths indicating the direction of travel of said automated guided vehicle along said paths.

2. The automated guided vehicle of claim 1, wherein said first section is modular and wherein said second section is modular.

3. The automated guided vehicle of claim 1, wherein said first section comprises two first passive omni-wheels, each of said two first passive omni-wheels being located on respective transverse sides of said central longitudinal axis, and wherein said second section comprises two second passive omni-wheels, each of said two second passive omni-wheels being located on respective sides of said central longitudinal axis.

4. The automated guided vehicle of claim 1, wherein said chassis has a bottom surface and wherein said first and second sections include plural respective mounting points located at various distances from said bottom surface for selectively mounting said first and second passive omni-wheels thereat.

5. The automated guided vehicle of claim 1, wherein said chassis has a bottom and wherein said automated guided vehicle includes a kick switch located on said chassis adjacent said bottom, which when engaged by the foot of a user activates said vehicle.

6. The automated guided vehicle of claim 1, wherein said automated guided vehicle includes a laser scanner on said first section and a laser scanner on said second section, each of said laser scanners detecting an obstruction on a portion of said paths and preventing said automated guided vehicle from colliding with the obstruction.

7. The automated guided vehicle of claim 1, wherein said automated guided vehicle includes an indicator light, which when illuminated indicates the ready status of said automated guided vehicle.

8. The automated guided vehicle of claim 1, wherein said automated guided vehicle includes an audible alarm for providing an audible signal indicating the location of said automated guided vehicle.

9. The automated guided vehicle of claim 1, wherein said automated guided vehicle includes channels for receipt of the tines of a fork lift to lift said automated guided vehicle off of the ground surface.

10. The automated guided vehicle of claim 1, additionally comprising a conveyor assembly mounted on said top plate, said conveyor assembly for supporting the cargo thereon and for moving the cargo from one position with respect to said top plate to another position with respect to said top plate.

11. An automated guided vehicle for navigating and bi-directionally traversing magnetic paths on a ground surface to carry cargo to selected points on the paths, said paths comprising a strip of magnetic material of a first polarity facing upward from the ground surface, said automated guided vehicle comprising:
a chassis having a longitudinal central axis, a first section, a second section, and an intermediate section between said first and second sections, said first section including at least one first passive omni-wheel rotatable about a fixed axis extending perpendicular to said central longitudinal axis but able to roll omni-directionally over the ground surface, said second section including at least one second passive omni-wheel rotatable about a fixed axis extending perpendicular to said central longitudinal axis but able to roll omni-directionally over the ground surface, a first drive wheel located at said intermediate section and rotatable about a first transverse axis extending perpendicularly to said central longitudinal axis, a first motor coupled to said first drive wheel for rotating said first drive wheel about said first transverse axis to cause said first drive wheel to roll along the ground surface, a second drive wheel located at said intermediate section and rotatable about a second transverse axis extending perpendicularly to said central longitudinal axis, a second motor coupled to said second drive wheel for rotating said second drive wheel about said second transverse axis to cause said second drive wheel to roll along the ground surface;
a top plate mounted on said chassis to support a cargo item or piece of equipment thereon;
control and navigation circuitry including a magnetic sensor for sensing said strip of magnetic material and for operating said first and second motors to cause said vehicle to roll over the ground surface and along a desired one of said paths, said desired one of said paths being established by said control and navigation circuitry, whereupon said automated guided vehicle is selectively moved to selected ones of said points under the control of said control and navigation circuitry, wherein said control and navigation circuitry comprises electronic components that are located on a board mountable on said intermediate section so that said electronic components are located within a hollow interior space in said intermediate section when said top plate is releasably mounted on said chassis, said board being removable from said intermediate section and oriented vertically to provide access to said electronic components when said top plate has been removed from said chassis; and
a source of illumination providing illumination adjacent said first section when said automated guided vehicle is moving in one direction along the paths and providing illumination adjacent said second section when said automated guided vehicle is moving in an opposite direction along said paths indicating the direction of travel of said automated guided vehicle along said paths.

12. The automated guided vehicle of claim 1, additionally comprising a coupler for releasably connecting a trailer hitch of a wheeled cart or wagon to said automated guided vehicle for towing by said automated guided vehicle.

13. The automated guided vehicle of claim 1, wherein said automated guided vehicle is responsive to a wireless remote for remote starting.

14. An automated guided vehicle system comprising plural predetermined magnetic paths on a ground surface and a vehicle for navigating and bidirectionally traversing said plural predetermined magnetic paths to carry cargo to selected points on said paths, said vehicle comprising:
a chassis having a longitudinal central axis, a first section, a second section, and an intermediate section between said first and second sections, said first section including at least one first passive omni-wheel rotatable about a fixed horizontal axis extending perpendicular to said central longitudinal axis but able to roll omni-directionally over the ground surface without rotating about a vertical axis, said second section including at least one second passive omni-wheel rotatable about a fixed horizontal axis extending perpendicular to said central longitudinal axis but able to roll omni-directionally over the ground surface without rotating about a vertical axis, a first drive wheel located at said intermediate section and rotatable about a first transverse axis extending perpendicularly to said central longitudinal axis, a first motor coupled to said first drive wheel for rotating said first drive wheel about said first transverse axis to cause said first drive wheel to roll along the ground surface, a second drive wheel located at said intermediate section and rotatable about a second transverse axis extending perpendicularly to said central longitudinal axis, a second motor coupled to said second drive wheel for rotating said second drive wheel about said second transverse axis to cause said second drive wheel to roll along the ground surface;

a top plate mounted on said chassis for releasably mounting a cargo item thereon;

control and navigation circuitry for operating said first and second motors to cause said vehicle to roll over the ground surface and along a desired one of said paths, said desired one of said paths being established by said control and navigation circuitry, whereupon said vehicle is selectively moved to selected ones of said points under the control of said control and navigation circuitry; and said vehicle providing illumination adjacent said first section when said vehicle is moving in one direction along said paths and for providing illumination adjacent said second section when said vehicle is moving in an opposite direction along said paths indicating the direction of travel of said vehicle along said paths.

15. The automated guided vehicle system of claim 14, wherein said first section is modular and wherein said second section is modular.

16. The automated guided vehicle system of claim 14, wherein said first section comprises two first passive omni-wheels, each of said two first passive omni-wheels being located on respective transverse sides of said central longitudinal axis, and wherein said second section comprises two second passive omni-wheels, each of said two second passive omni-wheels being located on respective sides of said central longitudinal axis.

17. The automated guided vehicle system of claim 14, wherein said chassis has a bottom and wherein said first and second sections include plural respective mounting points located at various distances from said bottom for selectively mounting said first and second passive omni-wheels thereat.

18. The automated guided vehicle system of claim 14, wherein said chassis has a bottom surface and wherein said vehicle includes a kick switch located on said chassis adjacent said bottom, which when engaged by the foot of a user activates said vehicle.

19. The automated guided vehicle system of claim 14, wherein said vehicle includes a laser scanner on said first section and a laser scanner on said second section, each of said scanners detecting an obstruction on a portion of said paths and preventing said vehicle from colliding with the obstruction.

20. The automated guided vehicle system of claim 14, wherein said vehicle includes an indicator light, which when illuminated indicates the ready status of said vehicle.

21. The automated guided vehicle system of claim 14, wherein said vehicle includes an audible alarm for providing an audible signal indicating the location of said vehicle.

22. The automated guided vehicle system of claim 14, wherein said vehicle includes channels for receipt of the tines of a fork lift to lift said vehicle off of the ground surface.

23. The automated guided vehicle system of claim 14, additionally comprising a conveyor assembly mounted on said top plate, said conveyor assembly for supporting the cargo thereon and for moving the cargo from one position with respect to said top plate to another position with respect to said top plate.

24. The automated guided vehicle system of claim 14, wherein said paths include a main section and at least one branch section extending in a direction away from a contiguous portion of said main section and a magnetic strip member of a different polarity than the polarity of said main section to enable the vehicle to roll from said main section onto said branch section under the control of said control and navigation circuitry.

25. An automated guided vehicle for navigating and bi-directionally traversing magnetic paths on a ground surface to carry cargo to selected points on the paths, said paths comprising a strip of magnetic material of a first polarity facing upward from the ground surface, said automated guided vehicle comprising:

a chassis having a longitudinal central axis, a first section, a second section, and an intermediate section between said first and second sections, said first section including at least one first passive omni-wheel rotatable about a fixed axis extending perpendicular to said central longitudinal axis but able to roll omni-directionally over the ground surface, said second section including at least one second passive omni-wheel rotatable about a fixed axis extending perpendicular to said central longitudinal axis but able to roll omni-directionally over the ground surface, a first drive wheel located at said intermediate section and rotatable about a first transverse axis extending perpendicularly to said central longitudinal axis, a first motor coupled to said first drive wheel for rotating said first drive wheel about said first transverse axis to cause said first drive wheel to roll along the ground surface, a second drive wheel located at said intermediate section and rotatable about a second transverse axis extending perpendicularly to said central longitudinal axis, a second motor coupled to said second drive wheel for rotating said second drive wheel about said second transverse axis to cause said second drive wheel to roll along the ground surface;

a top plate mounted on said chassis to support a cargo item or piece of equipment thereon;

control and navigation circuitry including a magnetic sensor for sensing said strip of magnetic material and for operating said first and second motors to cause said vehicle to roll over the ground surface and along a desired one of said paths, said desired one of said paths being established by said control and navigation circuitry, whereupon said automated guided vehicle is selectively moved to selected ones of said points under the control of said control and navigation circuitry, wherein said control and navigation circuitry comprises electronic components that are located on a board mounted on said intermediate section so that said electronic components are located within a hollow interior space in said intermediate section when said top plate is releasably mounted on said chassis, said board being removable from intermediate section and oriented vertically to provide access to said electronic components when said top plate has been removed from said chassis; and a source of illumination providing illumination adjacent said first section when said automated guided vehicle is moving in one direction along the paths and providing illumination adjacent said second section when said automated guided vehicle is moving in an opposite direction along said paths indicating the direction of travel of said automated guided vehicle along said paths.

26. The automated guided vehicle system of claim 14 additionally comprising a spool of shrink or stretch wrap material mounted for rotation about a vertical axis and located adjacent one of said selected points of said paths, said automated guided vehicle being rotatable about a central vertical axis by said control and navigation circuitry whereupon said shrink or stretch wrap material is unwound from said spool and wound about the cargo on said automated guided vehicle to secure the cargo in place.

27. The automated guided vehicle system of claim 14, additionally comprising a coupler for releasably connecting a trailer hitch of a wheeled cart or wagon to said automated guided vehicle for towing by said automated guided vehicle.

28. The automated guided vehicle system of claim 14, wherein said automated guided vehicle is responsive to a wireless remote for remote starting.

* * * * *